(12) United States Patent
Marolia et al.

(10) Patent No.: US 11,194,753 B2
(45) Date of Patent: Dec. 7, 2021

(54) PLATFORM INTERFACE LAYER AND PROTOCOL FOR ACCELERATORS

(71) Applicant: Intel Corporation, Santa Clara, CA (US)

(72) Inventors: Pratik M. Marolia, Hillsboro, OR (US); Stephen S. Chang, Hillsboro, OR (US); Nagabhushan Chitlur, Portland, OR (US); Michael C. Adler, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 15/836,856

(22) Filed: Dec. 9, 2017

(65) Prior Publication Data

US 2019/0042518 A1 Feb. 7, 2019

Related U.S. Application Data

(60) Provisional application No. 62/553,460, filed on Sep. 1, 2017.

(51) Int. Cl.
*G06F 3/00* (2006.01)
*G06F 13/42* (2006.01)
*G06N 3/08* (2006.01)
*G06F 9/455* (2018.01)

(52) U.S. Cl.
CPC ...... *G06F 13/4221* (2013.01); *G06F 9/45558* (2013.01); *G06N 3/08* (2013.01); *G06F 2009/45595* (2013.01); *G06F 2213/0026* (2013.01)

(58) Field of Classification Search
CPC .... G06F 9/45558; G06F 13/4221; G06N 3/08
USPC .......................................................... 710/8
See application file for complete search history.

(56) References Cited

U.S. PATENT DOCUMENTS

| | | |
|---|---|---|
| 2006/0282233 A1 | 12/2006 | Pasricha et al. |
| 2007/0073976 A1 | 3/2007 | Chitlur et al. |
| 2008/0052463 A1 | 2/2008 | Chitlur et al. |
| 2008/0109565 A1* | 5/2008 | Ajanovic .............. G06F 1/3253 710/8 |
| 2009/0089468 A1 | 4/2009 | Chitlur et al. |
| 2009/0089475 A1 | 4/2009 | Chitlur et al. |
| 2009/0327564 A1 | 12/2009 | Chitlur |
| 2010/0077179 A1 | 3/2010 | Stillwell, Jr. et al. |
| 2011/0246691 A1 | 10/2011 | Stillwell, Jr. et al. |
| 2013/0262727 A1 | 10/2013 | Chitlur |

(Continued)

OTHER PUBLICATIONS

"PCI Express Base Specification", Nov. 10, 2010, Revision 3.0, pp. 1-2 and 76 (Year: 2010).*

(Continued)

*Primary Examiner* — Chun Kuan Lee
(74) *Attorney, Agent, or Firm* — Alliance IP, LLC

(57) ABSTRACT

There is disclosed in one example an accelerator apparatus, including: a programmable region capable of being programmed to provide an accelerator function unit (AFU); and a platform interface layer (PIL) to communicatively couple to the AFU via an intra-accelerator protocol, and to provide multiplexed communication with a processor via a plurality of platform interconnect interfaces, wherein the PIL is to provide abstracted communication services for the AFU to communicate with the processor.

24 Claims, 11 Drawing Sheets

(56) References Cited

U.S. PATENT DOCUMENTS

| | | |
|---|---|---|
| 2014/0189299 A1 | 7/2014 | Narvaez et al. |
| 2014/0189704 A1 | 7/2014 | Narvaez et al. |
| 2014/0281276 A1 | 9/2014 | Marolia et al. |
| 2016/0147661 A1* | 5/2016 | Ambroladze ......... G06F 12/084 711/130 |
| 2018/0329847 A1* | 11/2018 | Kawai ................... G06F 13/387 |
| 2019/0034200 A1* | 1/2019 | Shimizu .............. G06F 9/30043 |

OTHER PUBLICATIONS https://en.wikipedia.org/w/index.php?title=Intel_QuickPath_Interconnect&oldid=733032090, Aug. 4, 2016 (Year: 2016).*

BDW + FPGA Beta Release 5.0.3 Core Cache Interface (CCI-P) Interface Specification, Intel, v1.0, pp. 1-69 (Year: 2016).*

German Patent and Trademark Office; First Office Action issued for Patent Application No. DE 102018006546.5, dated Jun. 11, 2019; 16 pages including English translation.

Gupta, PK; "Accelerating Datacenter Workloads," 26th International Conference on Field Programmable Logic and Applications (FPL); Aug. 2016; 28 pages.

Oliver, Neal, et al.; "A Reconfigurable Computing System Based on a Cache-Coherent Fabric," 2011 International Conference on Reconfigurable Computing and FPGAs; IEEE, 2001; 6 pages.

Parashar, Angshuman, et al.; "LEAP: A Virtual Platform Architecture for FPGAs," The First Workshop on the Intersections of Computer Architecture and Reconfigurable Logic (CARL), 2010; 6 pages.

\* cited by examiner

PLATFORM INTERFACE LAYER AND PROTOCOL FOR ACCELERATORS

CROSS REFERENCE TO RELATED APPLICATIONS

This Application claims priority to U.S. Provisional Application 62/553,460, titled "Communication Protocol for Field-Programmable Gate Array (FPGA) Accelerators," filed Sep. 1, 2017, which is incorporated herein by reference.

FIELD OF THE SPECIFICATION

This disclosure relates in general to the field of data center processing, and more particularly, though not exclusively, to a system and method for providing a platform interface layer and protocol for accelerators.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
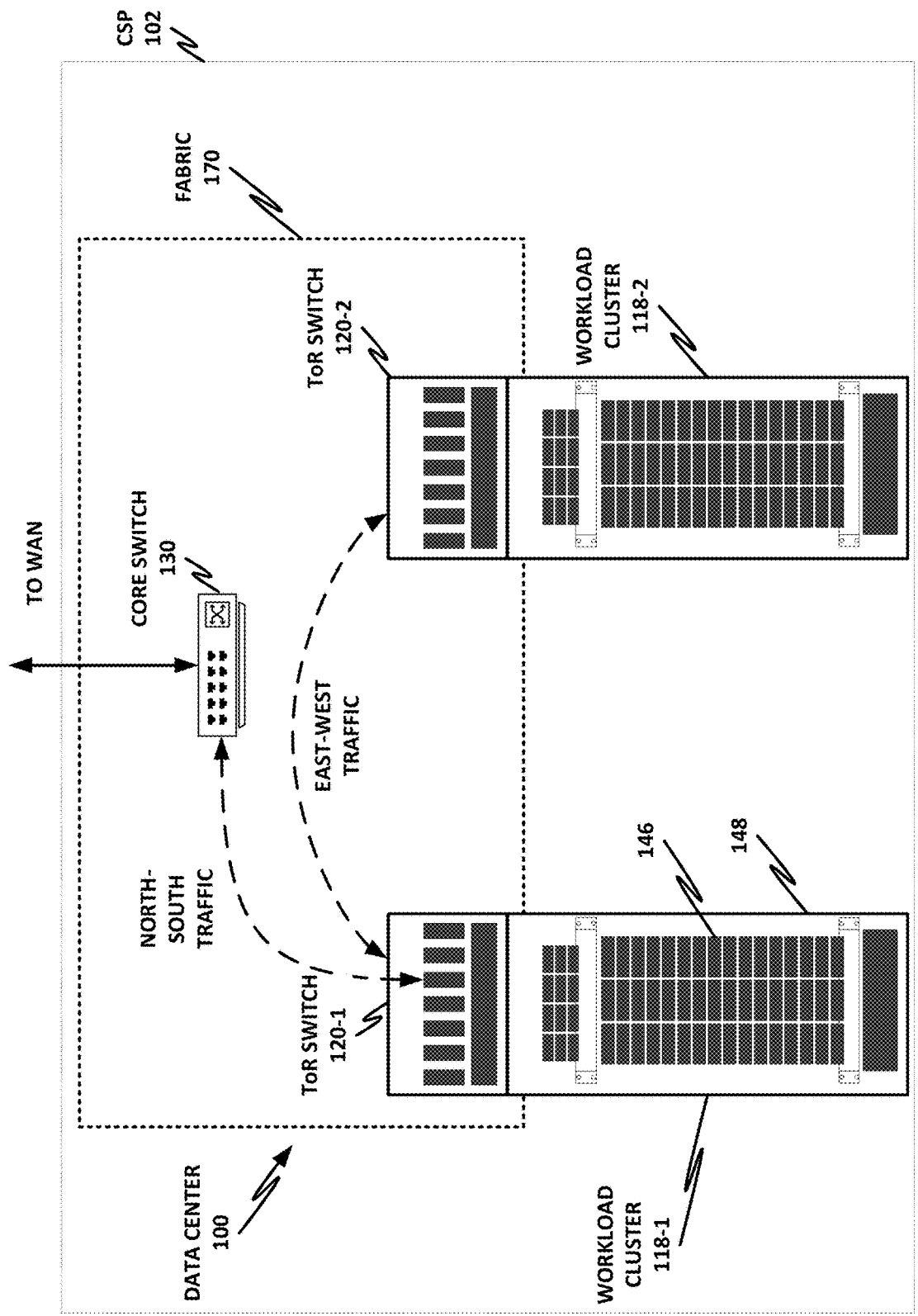
FIG. 1 is a block diagram of selected components of a data center with network connectivity, according to one or more examples of the present application.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

As data centers and high-performance computing (HPC) platforms become larger and more complex, certain functions also may become more specialized. For example, in an HPC context, the platform may be specially designed to perform very large-scale computational tasks such as artificial intelligence (AI), deep learning, gene sequencing, or other compute intensive tasks. In the context of a data center operated by a cloud service provider (CSP), high efficiency and low latency may be at a premium.

To increase efficiency and decrease latency, certain functions within the data center may be provided by hardware or programmable accelerators. For example, in HPC, accelerators may be used for deep learning algorithms or to process training sets. In data centers, accelerators can include, for example, encryption, decryption, compression, decompression, deep packet inspection, security services, or any other suitable network service. Often these accelerators are provided as part of a service chain that performs certain processing functions on incoming packets or outgoing packets to or from the data center to offload those functions from processors. This frees up processor cycles for other workloads which can be monetized.

Accelerators may be provided by application-specific integrated circuits (ASICs), or for greater flexibility may be provided by field-programmable gate arrays (FPGAs), which realize near ASIC-like performance, but have much of the flexibility of a programmable processor. Such accelerators may be provided in some cases by a third party, such as an original equipment manufacturer (OEM) or other provider. In the case of an ASIC hardware accelerator, the provider may provide the actual ASIC hardware. In the case of an FPGA, the third party provider may the FPGA hardware, and may also provide a tangible, non-transitory computer readable storage medium having stored thereon instructions such as register transfer language (RTL) or other hardware description language (HDL) instructions that can be loaded onto an FPGA in real time to provide an acceleration function unit (AFU).

This provides great flexibility to an operator of the data center. As workload demands and conditions change, the operator can allocate and provision new FPGAs with the appropriate AFU to handle current workloads. When those workloads change again, the data center operator may reprovision those same FPGAs to provide a different accelerator function.

In contemporary practice, it is common for the programmer of the FPGA to provide both the AFU programming, as well as programming that provides a platform interconnect to communicatively couple to processors in the data center. For example, an FPGA may be programmed with an interface according to the peripheral component interconnect express (PCIe) protocol, and input/output (I/O) pins on the FPGA may be mapped to PCIe physical bus interfaces. However, programming the details of such interfaces can be a burden on programmers of the FPGA. Furthermore, as interfaces change, the AFU code may need to be updated to meet the new demands, protocols, or standards. In some cases, the accelerator may also have a plurality of interconnects to the processor, thus requiring the AFU programmer to program more than one interface. For example, the FPGA may provide both a PCIe and a high-performance interconnect (HPI) such as an Intel® Ultra Path Interconnect (UPI) to the processor. Each of these interfaces represents a trade-off in abilities. PCIe may generally have higher bandwidth than UPI, but is not cache coherent. On the other hand, UPI is cache coherent and may have lower latency than PCIe, but may not support higher bandwidth. Thus, it may be advantageous to provide smaller payloads with low latency requirements (such as control plane messages) via the UPI, while large data transfers may better be provided via the higher bandwidth PCIe interface. Thus, not only does the AFU programmer need to program logic to support both interfaces, but he or she must also provide logic to select the preferred interface for each transaction. Further complications may arise when multiple instances of the same platform interconnect are provided. For example, in some cases, multiple PCIe interfaces may be provided for higher bandwidth. In that case, the AFU designer must provide logic for both PCIe interfaces, as well as intelligence for selecting which instance to use for a particular transaction.

Embodiments of the present specification advantageously alleviate this burden on the AFU programmer by providing a standardized platform interface layer (PIL) that may be operated on an accelerator and that may be independent of the AFU provided on the accelerator. The PIL of the present specification may itself be provided as a standardized set of RTL instructions that may be programmed onto a first region of an FPGA accelerator, and may remain resident on the FPGA indefinitely. The PIL may interoperate with the AFU via an intra-accelerator protocol such as core cache interface version P (CCI-P). Embodiments of the present specification define CCI-P at a protocol level, without reference to the underlying physical or link layer, thus enabling CCI-P to be supported over a large variety of different interfaces. CCI-P is referred to herein as an intra-accelerator protocol in the sense that the PIL and the AFU together, communicating via CCI-P, may in some cases be considered to constitute the "accelerator." In some cases, this means that the PIL is provided on a first region of the FPGA, and remains resident on that first region of the FPGA indefinitely, while the AFU is provided on a second region of the FPGA and may be switched out on demand to provide different accelerator functions. This should be understood, however, to be a nonlimiting example. Other examples of accelerators could include an ASIC with a PIL ASIC providing the intra-accelerator link to the AFU ASIC circuit. The accelerator could also be a coprocessor, GPU, or other processing entity, which may optionally be tuned or configured to provide the accelerator function. The PIL may similarly be an ASIC, FPGA, coprocessor, or any region or software running thereon that provides the PIL functions described herein. Throughout this specification, an FPGA with a first region for hosting an AFU and a second region for hosting a PIL, with the two regions configured to communicate via CCI-P, is provided as a common and illustrative example of an embodiment of the teachings of this specification. This illustrative example should, however, be understood to be nonlimiting, and a person having skill in the art can readily adapt the teachings as they relate to an FPGA with distinct regions to other embodiments of diverse types.

According to embodiments of the present specification, the PIL may be developed and provided by the OEM providing data center hardware, or by the operator of the data center. For example, Intel® Corporation is a world-class provider of data center components, including rackmount servers and rack scale architectures that provide both processors and FPGA accelerators. Thus, as the party providing the servers and the accelerators, Intel® may also provide the PIL for the accelerators. Third parties may then provide the specific AFU components that can be loaded onto FPGA accelerators and swapped as necessary to meet the changing demands of a data center.

As described herein, CCI-P is a novel interface protocol. Note that CCI-P as described herein is a protocol layer definition, and not necessarily a platform interface. Rather, the platform interface may be provided by a suitable physical and link layer, including existing physical and link layers such as UPIs, platform controller hubs (PCHs), or similar. Advantageously, CCI-P as described herein is a relatively simple protocol definition, while also providing a high degree of flexibility and programmability to meet specific needs for accelerator platforms.

CCI-P may provide an RTL interface between the AFU and the PIL as described herein, and provides to the AFU a simplified view of platform capabilities. This allows AFU designers to develop acceleration content using a standardized tool flow and capabilities. CCI-P provides an interface with enough flexibility, portability, and scalability to meet the demands of the data center, while also allowing easy migration between different physical FPGA platforms. The use of a standardized CCI-P interface by AFU designers promotes an ecosystem in which AFU designers are more productive and can focus on the acceleration functions, rather than managing the details of communicating with the processor. Rather, AFUs can be deployed in a plug-and-play manner, and can be ported across different FPGAs.

As necessary, the PIL may be modified to meet the underlying hardware demands of a specific FPGA platform. Thus, the exact or identical AFU RTL may be used on a number of different FPGAs, without the AFU designer needing to be concerned about the details of handling communication protocols.

Advantageously, CCI-P provides a high degree of simplicity. CCI-P abstracts away the low level protocol details of the platform interface, but provides to the AFU designer sufficient capabilities to allow for data path and caching optimizations.

CCI-P also provides a great degree of portability for AFU designers. CCI-P defines a memory model that can work across different platform interfaces such as PCIe and an HPI such as UPI.

CCI-P also provides a high degree of scalability. This includes the ability to provide physical link aggregation for increased bandwidth.

CCI-P also provides extensibility. CCI-P can be provided as a standard that can be extended to add new capabilities that may be important to allow AFU designers to rapidly innovate on accelerators.

Embodiments of CCI-P according to the present specification provide a simple load/store protocol for accessing system memory. CCI-P may also provide a simple first in, first out (FIFO)—like flow control. It can abstract away multiple physical links behind a single logical interface with a plurality of virtual channels (VCs). The VCs may provide the flexibility for explicit link selection on the AFU side, or in automated mode. In other words, the AFU may manually select a preferred link for a transaction by signing the transaction to a particular virtual channel. Alternately, the AFU can simply provide the transaction to the PIL, and allow the PIL to select a preferred virtual channel and/or platform interface to handle the transaction.

Embodiments of CCI-P also provide a relaxed memory model, with non-posted writes and explicit synchronization primitives.

Embodiments of CCI-P also provide the ability for the AFU to provide caching hints. This can be used by the AFU to manage cache states. In some examples, the AFU can use a virtual channel assignment to explicitly select a platform interconnect that is known to be cache coherent, and may provide therewith caching hints. Alternately, the AFU can provide a generic transaction without explicitly selecting a particular interconnect, and may provide therewith caching hints. When the PIL handles the transaction, it may select a preferred platform interconnect to handle the transaction. If the selected platform interconnect is a cache coherent interconnect, then the caching hints may be provided on the platform interconnect with the transaction. Alternately, if the selected platform interconnect is a non-cache coherent interconnect, then the caching hints may be contextually ignored as not being applicable to the selected platform interconnect.

Embodiments of CCI-P provide access to two types of memory: main memory and I/O memory.

Main memory is the memory attached to the processor and exposed to the operating system. Requests from the accelerator to the main memory may be referred to herein as "upstream requests."

I/O memory may be implemented within the accelerator device itself. It may be up to the accelerator how to implement and organize this memory. For example, the accelerator may choose flip-flops, embedded standard random access memory (SRAM), or external memory. Requests from the processor to the I/O memory may be referred to as "downstream requests."

Note that some embodiments of the present specification may provide a coherent interconnect such as UPI, or Intel® QuickPath Interconnect (QPI), wherein the I/O memory may be coherently mapped to the main memory address space.

Embodiments of the present specification also provide channels and virtual channels. This can provide grouping of signals that together completely define a request or response. The CCI-P protocol defines separate read and write channels for upstream reads and writes, with independent flow control.

In certain embodiments of the present specification, all upstream requests are non-posted, meaning that every request is required to receive a response.

Embodiments of the present specification also provide a burst mode. Burst mode provides the power of two coherent links (CLs).

The use of two CLs naturally guarantees that a burst request does not cross a page boundary, such as a 4 KB page boundary. As appropriate to the embodiment, the burst mode may provide either packed or unpacked responses. Unpacked responses may arrive out of order. Each CL within an unpacked response may be identified with a CL number.

Embodiments of the present specification also provide caching hints. Upstream read and write requests may have two types of caching hints:

a. What is the expected cache state on the accelerator cache (local cache)?

b. What is the expected cache on the CPU cache (remote cache)? This is similar to data definition input/output (DDIO) on PCIe.

For a modified/exclusive/shared/invalid (MESI) coherency model, CCI-P may support shared/invalid (S/I) read caching hints and modified/exclusive/invalid (M/E/I) write caching hints.

Caching hints may be used to tune the cache performance for the workload. For example, I/O workloads may not want to cache the data, so they may use the invalid ("I") hint. On the other hand, a graph traversal workload may use shared ("S") or modified ("M") hints to exploit temporal locality of the cache.

Embodiments of CCI-P may provide an address mode in which the address width is defined to match the CPU's virtual address width. Advantageously, the use of physical or virtual addressing mode is agnostic to the CCI-P protocol. Rather, this may be determined by the system. This can greatly simplify memory management for the AFU.

Embodiments of the CCI-P may also include a plurality of virtual channels. For example, one version of CCI-P supports three virtual channels. The properties of the virtual channels may be platform dependent. For example, a virtual channel 1 may be tuned for lowest latency, whereas a virtual channel 2 may be tuned for highest bandwidth for small bursts. In some embodiments, these virtual channels may be persistently mapped to a particular interface or type of interface. For example, a low latency virtual channel may be persistently mapped to a UPI interface, whereas a high bandwidth virtual channel may be persistently mapped to a PCIe interface. This is, however, a nonlimiting example, and in other embodiments, virtual channels may be generically tuned for certain performance parameters, and may dynamically access platform interconnects according to the changing needs of the system. In some embodiments, where a virtual channel is persistently mapped to a species of platform interconnect, if a plurality of interconnects are provided (e.g., multiple PCIe interfaces), then assigning a transaction to the PCIe virtual channel may be considered a directive to handle the transaction via PCIe. But in those cases, the PIL may still manage assigning traffic to one of the plurality of instances of the interconnect, based on factors such as loading, temporal or spatial proximity, flow control rules, crosstalk, or other factors.

Note that some embodiments may also provide all virtual channels with the same properties, wherein the virtual channels simply provide divisions of traffic. Embodiments of CCI-P simply define a memory model that each VC should adhere to.

CCI-P may also define a virtual automatic (or "auto") mode, which aggregates all virtual channels into one. Virtual auto mode presents the sum total bandwidth across all virtual channels to the AFU. This mode is, for example, may be optimized for throughput rather than for latency. This simplified mode makes it very easy for an AFU designer to provide an AFU design without being concerned about the details of how transactions are handled. Rather, all transactions are simply provided to the PIL, and the AFU may leave it up to the PIL to determine how to handle them, and which platform interconnect to assign them to. If the AFU designer requires higher performance or greater flexibility, then the AFU designer may take advantage of explicit virtual channels.

Note that even in the case of explicit virtual channels, the AFU designer does not need to be concerned about the details of how the virtual channel is implemented. For example, if a virtual channel is defined as a low latency virtual channel, while a second virtual channel is defined as a high bandwidth virtual channel, the AFU designer need not necessarily know or care that the first virtual channel is provided by a UPI link, while the second virtual channel is provided by a PCIe link. Furthermore, as interconnect technologies evolve, and those interconnects are replaced by next-generation interconnects, the AFU need not necessarily change, as it has already assigned certain traffic classes to low latency or high bandwidth, and those can be handled by evolving technologies that provide those same features.

On the other hand, in some embodiments the virtual channels may be persistently mapped to a particular physical link. For example, in some FPGAs, two of the virtual channels may be persistently linked to two PCIe interfaces, whereas a third virtual channel may be mapped to an FPGA cache backed by the UPI link.

Embodiments of CCI-P provide a very basic memory model. The CCI-P memory model may be designed to provide no ordering guarantees, thus providing a basic common denominator. However, CCI-P also provides features like non-posted writes and write fence that enable an AFU designer to build more complex memory models on top of CCI-P. Note that a common FPGA is a spatial architecture in which a number of independent processing engines may operate on independent data sets. Thus, there may be no ordering dependencies across the processing engines in a spatial array. Therefore, the CCI-P basic memory model introduces no dependencies, but provides the lowest latency and uses few logical resources.

An AFU designer may build on top of CCI-P a more complex memory channel structure to enforce ordering. This approach allows spatial architecture to implement fine-grained ordering that is well-suited for a particular application. For example, a designer may implement a read reorder buffer per processing engine, or across a group of processing engines to reduce the gate cost.

Enforcing of write ordering on CCI-P may be provided, for example, by intra-VC write observability and inter-VC write observability.

Intra-VC write observability may apply to two different requests on the same VC, with the exception of virtual auto. Upon receiving a memory write response, the write has reached a local observability point. All future reads from the accelerator to the same virtual channel get the new data. All future writes on the same virtual channel replace the data.

For inter-VC write observability, a memory write response does not mean that the data are globally observed across channels. Rather, a subsequent read on a different channel may return the old data. Write fence to virtual auto may guarantee a synchronization across all VCs. Thus, all preceding writes are pushed to a global observability point. Upon receiving a write fence response, all future reads from an accelerator return the new data.

Embodiments of CCI-P promote hierarchical memory design. For example, the PIL presider may provide modules built on top of CCI-P that maintain the same CCI-P signaling interface, but add properties on memory interfaces. This means that the interface itself may remain identical, but memory takes on new semantics, such as guaranteeing total store order or use of virtual instead of physical addresses.

Embodiments of CCI-P may provide the following request types.

| Type | Request | Description |
| --- | --- | --- |
| Memory Write | WrLine_I | Write to memory, don't cache it locally |
|  | WrPush_I | Write to memory, don't cache it locally, but place it in the CPU cache |
|  | WrLine_M | Write to memory, leave Modified data it in local cache. |
| Memory Read | RdLine_I | Read from memory, don't cache it locally |
|  | RdLine_S | Read from memory, and place it in local cache in Shared state |
|  | RdLine_E | Read from memory, and place it in local cache in Exclusive state |
| MMIO | MMIO Read | MMIO Read request from CPU to Accelerator. Accelerator must return a response within a defined time window. |
|  | MMIO Write | MMIO Write request from CPU to Accelerator. No response accepted from Accelerator |
| Special Messages | WrFence | Write memory barrier, guarantees that all requests preceding this are committed before subsequent requests are processed. |

-continued

| Type | Request | Description |
| --- | --- | --- |
| Possible Future Extensions | RdPrefetch, WrPrefetch | Pre-fetch a request, performance optimization to pre-fetch the translations into IOMMU TLBs and perhaps local cache. |
| | Atomics | Atomic operations |
| | Read_w_Lock | RdLine_E with a temporal lock. A lock will block subsequent snoops to this line, until the lock is released by a special write or lock expiration. |
| | MMIO Write (non-posted) | MMIO Write request from CPU to Accelerator. CPU expects the Accelerator to acknowledge that the request was Intel ® Confidential accepted. |

Note that these request types are provided by way of nonlimiting example only, and other request types may be provided in other embodiments of CCI-P.

A system and method for providing a platform interface layer and protocol for accelerators will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center with connectivity to network 100 of a cloud service provider (CSP) 102, according to one or more examples of the present specification. Embodiments of network 100 disclosed herein may be adapted or configured to interoperate with a platform interface layer and protocol for accelerators according to the teachings of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 102 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 170. In other embodiments, the UPI (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies that may be found in the data center include, by way of nonlimiting example, Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in high-performance computing (HPC) applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
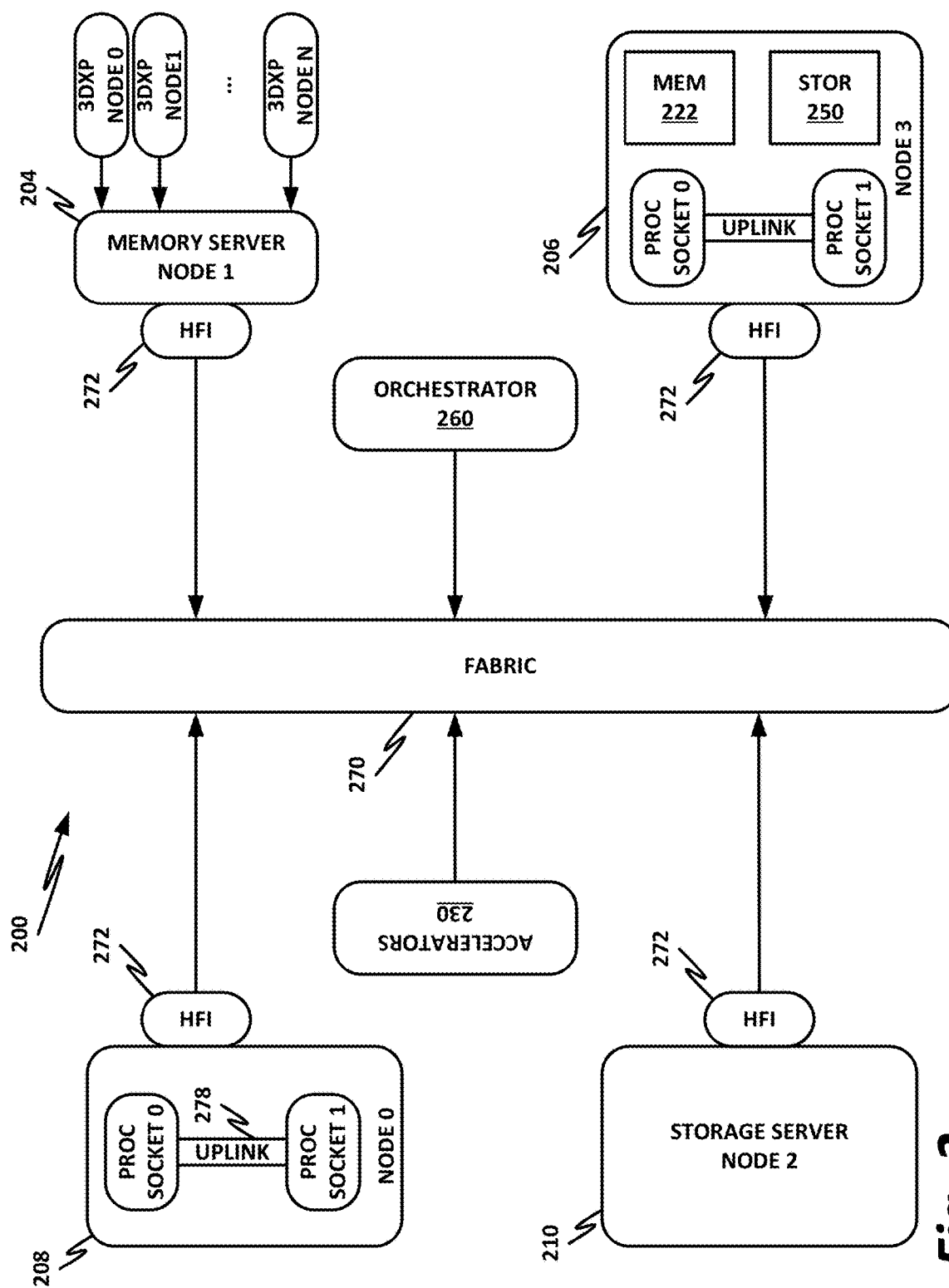
FIG. 2 is a block diagram of selected components of an end-user computing device, according to one or more examples of the present specification.

FIG. 2 is a block diagram of a computing device 200 according to one or more examples of the present specification. Embodiments of computing device 200 disclosed herein may be adapted or configured to interoperate with a platform interface layer and protocol for accelerators according to the teachings of the present specification. As above, computing device 200 may provide, as appropriate, cloud service, high-performance computing, telecommunication services, enterprise data center services, or any other compute services that benefit from a computing device 200.

In this example, a fabric 270 is provided to interconnect various aspects of computing device 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, computing device 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because computing device 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout computing device 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D XPoint (3DXP™), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes a HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

Computing device 200 may also include accelerators 230. These may provide various accelerated functions, including hardware or coprocessor acceleration for functions such as packet processing, encryption, decryption, compression, decompression, network security, or other accelerated functions in the data center. In some examples, accelerators 230 may include deep learning accelerators that may be directly attached to one or more cores in nodes such as node 0 208 or node 3 206. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3DXP™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
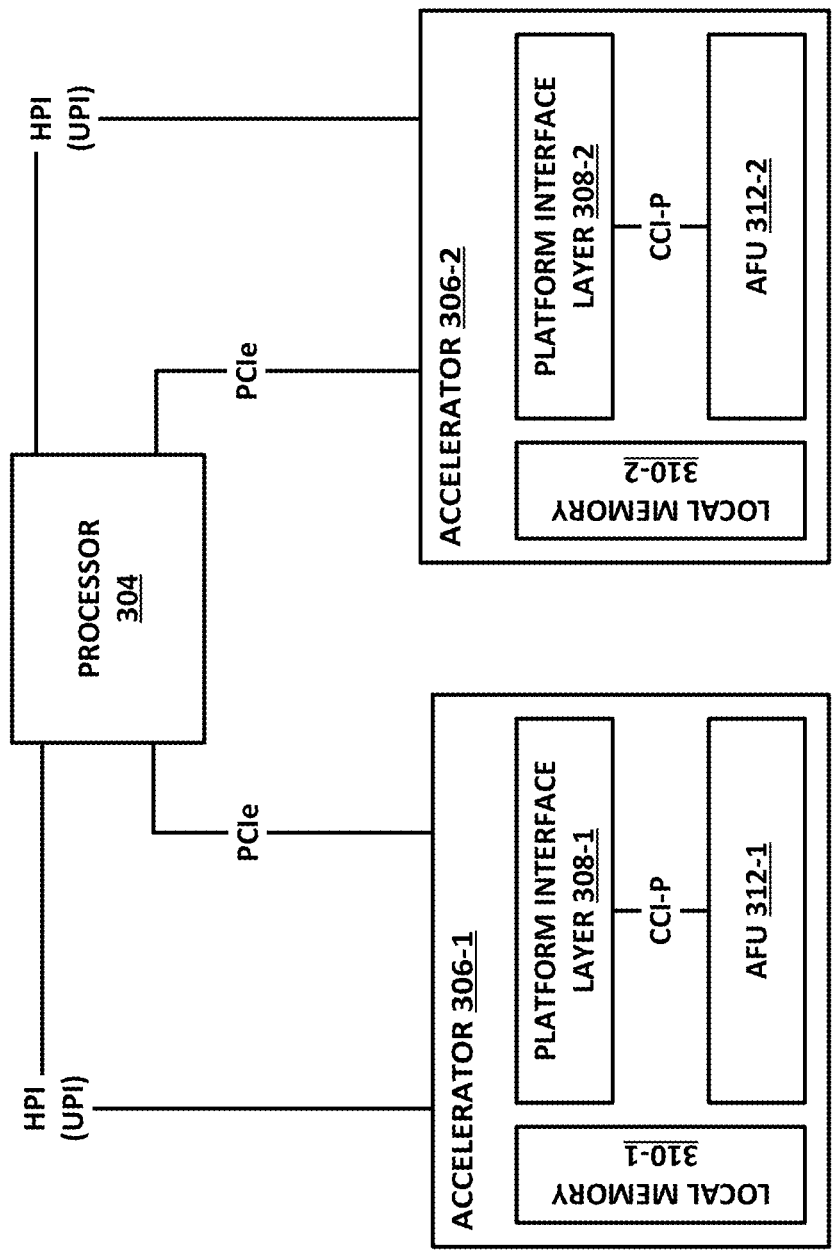
FIG. 3 is a block diagram of selected elements that may be present for example in a data center, according to one or more examples of the present specification.

FIG. 3 is a block diagram of selected elements that may be present for example in a data center, according to one or more examples of the present specification. In the example of FIG. 3, one or more processors 304 may be communicatively coupled to one or more accelerators 306.

In this specific example, processor 304 is providing a workload that benefits from the use of accelerators 306-1 and 306-2. As discussed above, this specific example discusses accelerators 306 hosted on FPGA platforms. But in a more general sense, accelerators 306 may be provided on any suitable hardware, firmware, and/or software platform, and may be optimized to provide an accelerated function.

In this example, accelerator 306-1 and accelerator 306-2 both communicatively couple to processor 304 via two platform interconnects.

The PCIe interconnect may be provided as a high-bandwidth interconnect, but may have relatively higher latency, and may not be cache coherent. On the other hand, a high performance interconnect such as UPI may be provided with relatively lower latency, and may be cache coherent.

As described above, accelerator 306-1 and accelerator 306-2 may both be provided with a platform interface layer 308. Accelerators 306-1 and 306-2 are also provided respectively with AFUs 312-1 and 312-2.

If accelerators 306-1 and 306-2 are both provided on the same physical platform, such as the same model of FPGA, platform interface layer 308-1 and 308-2 may be identical to one another. On the other hand, AFU 312-1 and 312-2 may be different instances of the same accelerator function, or may be completely different accelerator functions.

Advantageously, AFUs 312 need not be concerned with the specific hardware implementations of interfaces, such as the PCIe and UPI interfaces illustrated herein. Rather, platform interface layers 308 provide an abstraction layer so that AFU 312 can communicate without being tied to a particular interconnect or protocol.

As described above, AFUs 312 may communicate on a virtual auto model, in which all transactions are provided to PIL 308 without designation of a particular virtual channel. Alternately, PIL 308 may map particular virtual channels to different interfaces, such as mapping two virtual channels to PCIe, and one virtual channel to UPI. In that case, AFU 312 may direct traffic to a particular virtual channel. However, even when a AFU 312 directs traffic to a particular virtual channel, it need not be concerned with the details of how that virtual channel is implemented. For example, a first virtual channel may be provided with a low latency or cache coherent property, while a second virtual channel may be provided with a high bandwidth property. AFU 312 can assign traffic to the high bandwidth or low latency virtual channels without needing to be concerned about the specific platform interconnects that service those virtual channels.

Each accelerator 306 may also include a local memory 310, specifically local memory 310-1 for accelerator 306-1, and local memory 310-2 for accelerator 306-2.

In some embodiments, a UPI interconnect may maintain cache coherency between a cache of local memory 310-1 and a cache of processor 304. Furthermore, certain interconnects such as UPI or QPI may provide coherency, such that local memory 310-1 can be mapped to the memory address space of processor 304.

In the example where accelerators 306 are provided on FPGAs, PIL 308 may be maintained persistently on the FPGA, such as in a first region of the FPGA designated for the PIL 308. AFU 312 may, however, be swapped out as the accelerator function changes. For example, if processor 304 is allocated to a video streaming service, then accelerators 306 may be dedicated to compression or decompression acceleration, in which a compression or decompression AFU 312 may be loaded onto accelerator 306.

As workload demands on the data center change, processor 304 may be redesignated as performing a different function, such as a secure communication. In that case, accelerator 306 may better be used to provide offloaded compression or decompression. Thus, a new AFU 312 may be loaded onto accelerator 306, and accelerator 306 may now provide compression or decompression acceleration. However, because PIL 308 provides a standardized interface via CCI-P, the identical PIL 308 may be maintained on accelerator 306 even as the accelerated function of accelerator 306 changes. Note that PIL 308 could also be provided by an ASIC, coprocessor, DSP, or any other hardware, firmware, and/or software.

Figure 4:
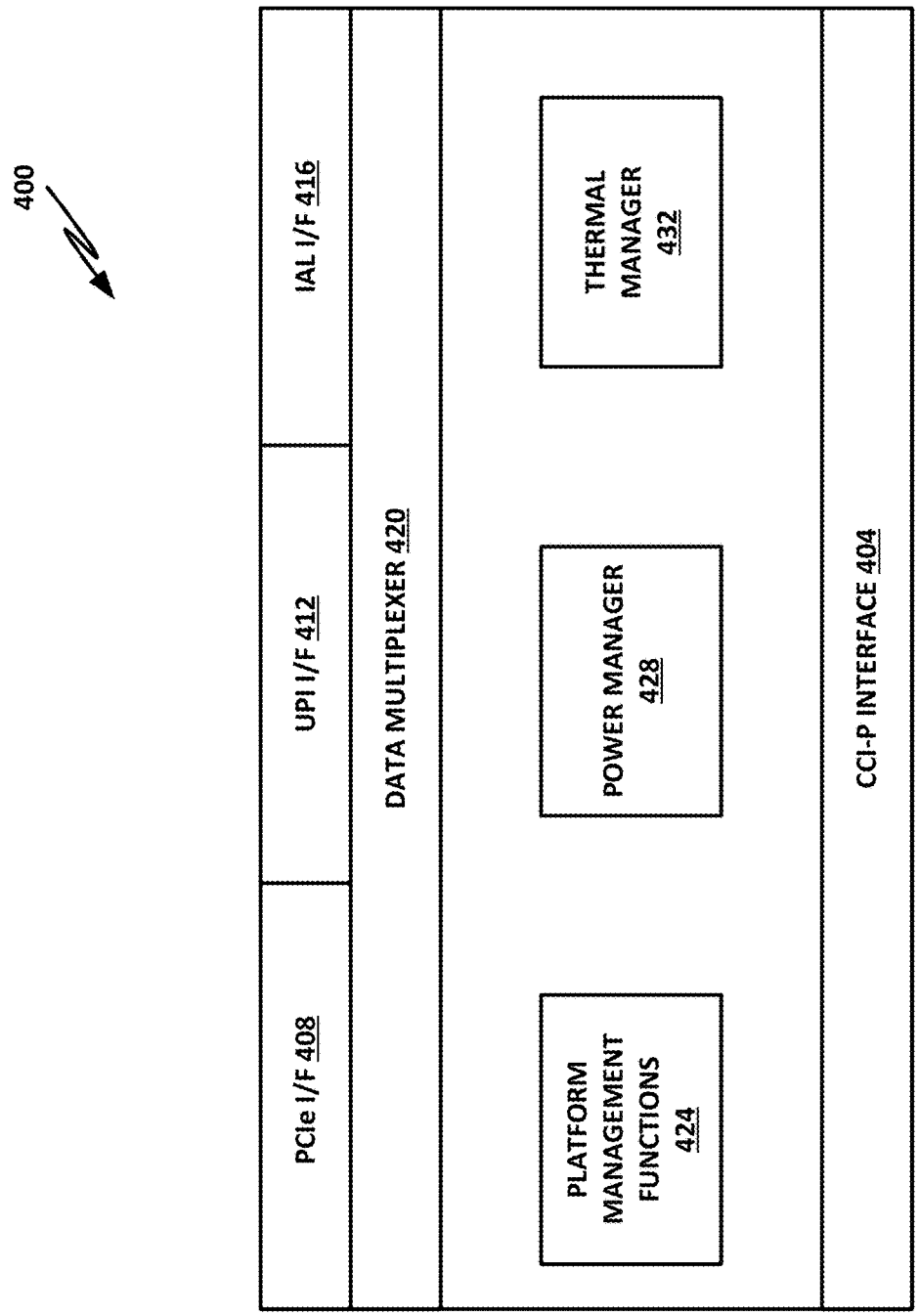
FIG. 4 is a block diagram of a platform interface layer, according to one or more examples of the present specification.

FIG. 4 is a block diagram of a platform interface layer 400, according to one or more examples of the present specification. PIL 400 is provided as a nonlimiting example, and illustrates various functions that may be provided by a PIL. It should be understood that a PIL is not required to provide all of the functions illustrated on PIL 400, and may provide other functions in addition to those shown in this figure.

In this embodiment, PIL 400 includes a CCI-P interface 404, which provides the logic for the CCI-P, and may also provide the physical routing or internal pinouts for the CCI-P interface.

On the other side, PIL 400 may provide a plurality of interfaces, such as PCIe interface 408, UPI interface 412, or Intel® accelerator link interface (IAL) 416. These three interfaces are provided by way of nonlimiting example, and many other interfaces are possible. It is expressly anticipated herein that future interfaces may supplement or supplant currently known interfaces, and it is anticipated that as those interfaces evolve, PIL 400 may evolve with them, thus providing new interfaces to take advantage of those new technologies. However, advantageously, in many cases CCI-P interface 404 may not need to change with those new interfaces. Rather, if those interfaces maintain common properties to which virtual channels can be assigned, then CCI-P interface 404 may continue to present the same interface to an AFU, and an AFU need not be changed to take advantage of those new interfaces.

PIL 400 includes a data multiplexer 420, which may be configured to provide a plurality of virtual channels such as three virtual channels. Each virtual channel may be mapped to one of PCIe interface 408, UPI interface 412, and IAL interface 416. In other embodiments, different virtual channel mappings may be used.

On the side of CCI-P interface 404, the AFU may be presented with virtual channels that have particular properties without being tied to a particular technology. For example, a virtual channel may be provided for low latency, while another virtual channel may be provided for high bandwidth. Other properties may also be used as required for a particular embodiment. As upstream data arrives at PIL 400, data multiplexer 420 assigns the upstream transaction to the appropriate interface according to the virtual channel, or in the case of virtual auto, selects a preferred virtual channel based on the best available interface to handle the traffic. The data multiplexer 420 may then send the transaction upstream via the appropriate interface. As downstream transactions arrive, data multiplexer 420 may also assign them to an appropriate virtual channel, for example, based on the interface that the transaction arrived on. Data multiplexer 420 may then send the transaction downstream to the AFU via CCI-P interface 404.

Some embodiments of PIL 400 may also provide other management functions for the accelerator. For example, where the accelerator is an FPGA platform, PIL 400 may provide platform management functions 424, power management 428, or thermal management 432 by way of illustrative and nonlimiting example.

Figure 5:
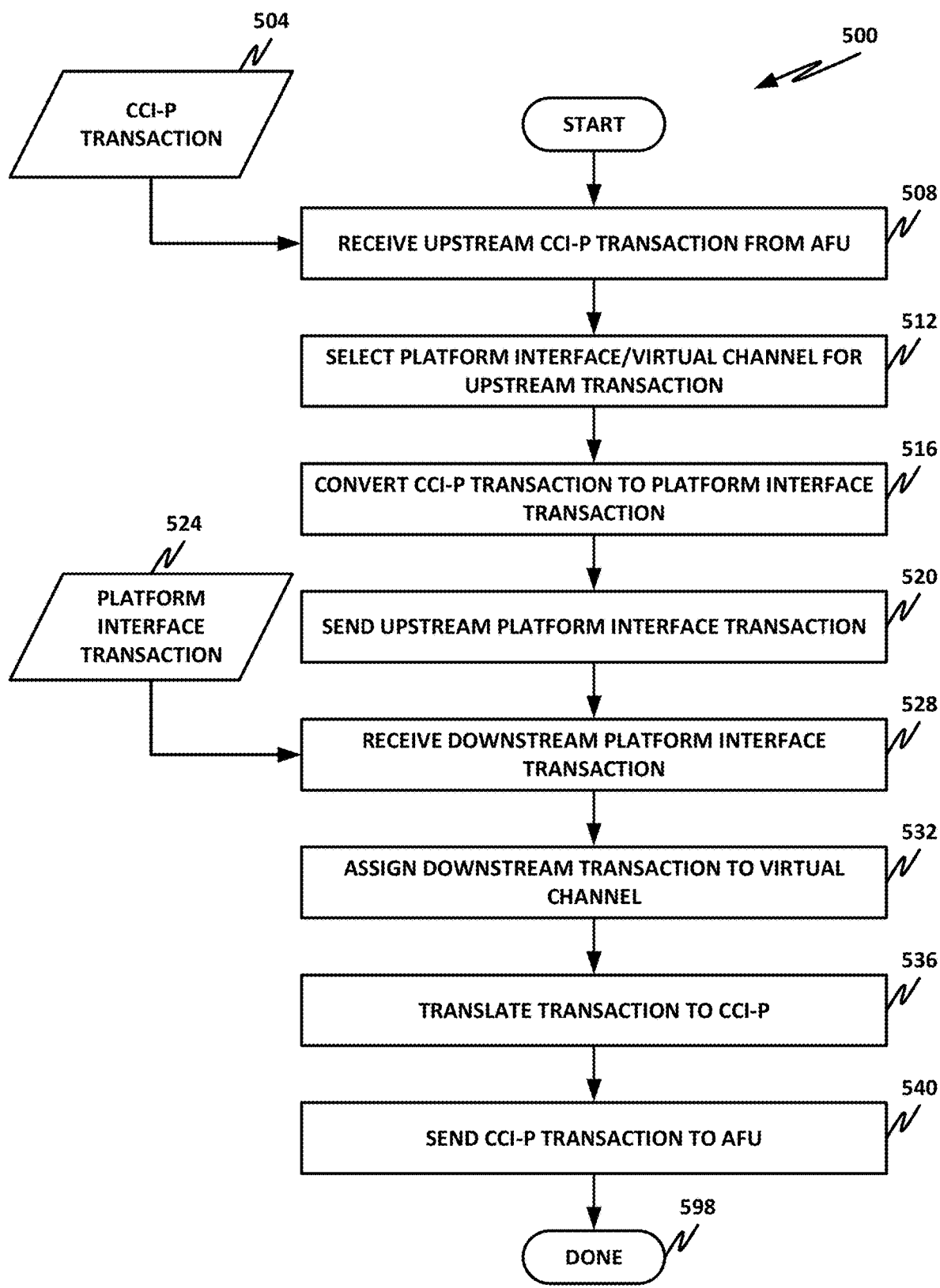
FIG. 5 is a flowchart of a method that may be provided by a system, according to one or more examples of the present specification.

FIG. 5 is a flowchart of a method 500 that may be provided by a system, according to one or more examples of the present specification. For example, all or part of method 500 may be provided by a PIL as illustrated in the foregoing description and figures.

In block 508, the system receives an upstream CCI-P transaction 504 from the AFU.

In block 512, the system may select a platform interface and/or virtual channel for the upstream transaction. Note that in some cases, the upstream transaction may have had assigned to it an explicit virtual channel by the AFU, and that explicit virtual channel may be mapped to a particular platform interface. In that case, mapping the transaction to the appropriate platform interface may simply comprise directing the transaction to the platform interface that services the virtual channel explicitly set by the AFU. In other examples, such as where the AFU is operating in virtual automatic mode, the system may employ an algorithm to select an appropriate virtual channel and/or platform interface for handling the transaction. Thus, selecting a preferred platform interface for the transaction may be a matter of simply directing the transaction to a platform interface mapped to the virtual channel, or may include intelligently deciding which platform interface is best placed to service the transaction.

In block 516, the system converts the CCI-P transaction to a platform interface transaction. For example, if the system has selected a PCIe interface to service the transaction, then the system converts the CCI-P transaction into a PCIe transaction.

In block 520, the system sends the transaction upstream via the selected platform interface. For example, if PCIe was selected, then the system places the upstream transaction on the PCIe bus.

In block 528, the system may receive a downstream platform interface transaction 524 via a particular platform interface. For example, platform interface transaction 524 may be a response to CCI-P transaction 504, or may be an unrelated platform interface transaction as appropriate.

In block 532, the system assigns the downstream transaction to a particular virtual channel. As above, this may include assigning the transaction to a virtual channel that is persistently mapped to the platform interface, or employing additional intelligence to select a preferred virtual channel for servicing the downstream transaction. In some cases, the downstream transaction is associated with an upstream transaction. For example, it may be a response to the upstream transaction, in which case the downstream transaction may be assigned to the same virtual channel as the upstream transaction.

In block 536, the system translates the downstream platform interface transaction into a CCI-P transaction.

In block 540, the system sends a CCI-P transaction to the AFU via the CCI-P protocol.

In block 598, the method is done.

Figure 6:
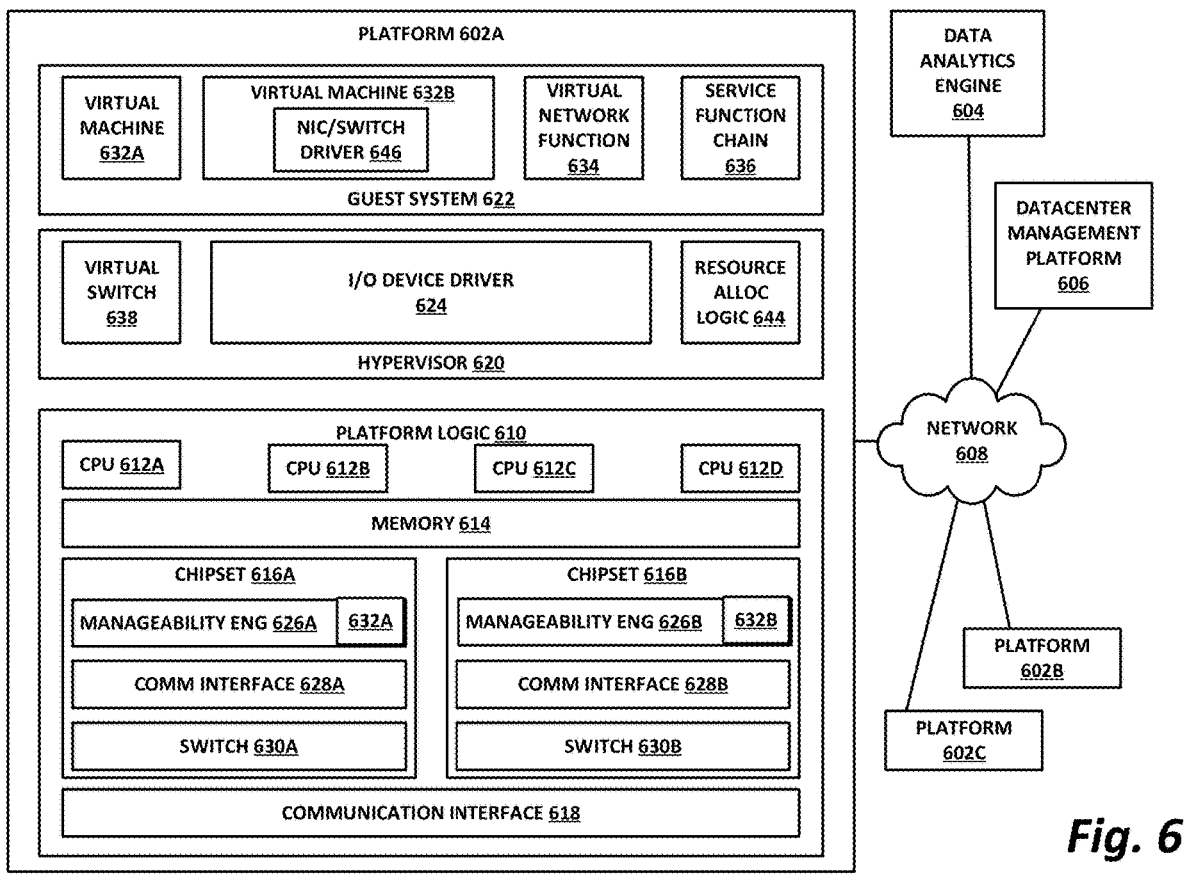
FIG. 6 is a block diagram of components of a computing platform, according to one or more examples of the present specification.

FIG. 6 illustrates a block diagram of components of a computing platform 602A according to one or more examples of the present specification. Embodiments of computing platform 602A disclosed herein may be adapted or configured to interoperate with a platform interface layer and protocol for accelerators according to the teachings of the present specification. In the embodiment depicted, platforms 602A, 602B, and 602C, along with a data center management platform 606 and data analytics engine 604 are interconnected via network 608. In other embodiments, a computer system may include any suitable number of (i.e., one or more) platforms. In some embodiments (e.g., when a computer system only includes a single platform), all or a portion of the system management platform 606 may be included on a platform 602. A platform 602 may include platform logic 610 with one or more central processing units (CPUs) 612, memories 614 (which may include any number of different modules), chipsets 616, communication interfaces 618, and any other suitable hardware and/or software to execute a hypervisor 620 or other operating system capable of executing workloads associated with applications running on platform 602. In some embodiments, a platform 602 may function as a host platform for one or more guest systems 622 that invoke these applications. Platform 602A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 606, hypervisor 620, or other operating system) of computer platform 602A may assign hardware resources of platform logic 610 to perform workloads in accordance with the stress information. In some embodiments, self-diagnostic capabilities may be combined with the stress monitoring to more accurately determine the health of the hardware resources. Each platform 602 may include platform logic 610. Platform logic 610 comprises, among other logic enabling the functionality of platform 602, one or more CPUs 612, memory 614, one or more chipsets 616, and communication interfaces 628. Although three platforms are illustrated, computer platform 602A may be interconnected with any suitable number of platforms. In various embodiments, a platform 602 may reside on a circuit board that is installed in a chassis, rack, or other suitable structure that comprises multiple platforms coupled together through network 608 (which may comprise, e.g., a rack or backplane switch).

CPUs 612 may each comprise any suitable number of processor cores and supporting logic (e.g., uncores). The cores may be coupled to each other, to memory 614, to at least one chipset 616, and/or to a communication interface 618, through one or more controllers residing on CPU 612 and/or chipset 616. In particular embodiments, a CPU 612 is embodied within a socket that is permanently or removably coupled to platform 602A. Although four CPUs are shown, a platform 602 may include any suitable number of CPUs.

Memory 614 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 614 may be used for short, medium, and/or long term storage by platform 602A. Memory 614 may store any suitable data or information utilized by platform logic 610, including software embedded in a computer readable medium, and/or encoded logic incorporated in hardware or otherwise stored (e.g., firmware). Memory 614 may store data that is used by cores of CPUs 612. In some embodiments, memory 614 may also comprise storage for instructions that may be executed by the cores of CPUs 612 or other processing elements (e.g., logic resident on chipsets 616) to provide functionality associated with the manageability engine 626 or other components of platform logic 610. A platform 602 may also include one or more chipsets 616 comprising any suitable logic to support the operation of the CPUs 612. In various embodiments, chipset 616 may reside on the same die or package as a CPU 612 or on one or more different dies or packages. Each chipset may support any suitable number of CPUs 612. A chipset 616 may also include one or more controllers to couple other components of platform logic 610 (e.g., communication interface 618 or memory 614) to one or more CPUs. In the embodiment depicted, each chipset 616 also includes a manageability engine 626. Manageability engine 626 may include any suitable logic to support the operation of chipset 616. In a particular embodiment, a manageability engine 626 (which may also be referred to as an innovation engine) is capable of collecting real-time telemetry data from the chipset 616, the CPU(s) 612 and/or memory 614 managed by the chipset 616, other components of platform logic 610, and/or various connections between components of platform logic 610. In various embodiments, the telemetry data collected includes the stress information described herein.

In various embodiments, a manageability engine 626 operates as an out-of-band asynchronous compute agent which is capable of interfacing with the various elements of platform logic 610 to collect telemetry data with no or minimal disruption to running processes on CPUs 612. For example, manageability engine 626 may comprise a dedicated processing element (e.g., a processor, controller, or other logic) on chipset 616, which provides the functionality of manageability engine 626 (e.g., by executing software instructions), thus conserving processing cycles of CPUs 612 for operations associated with the workloads performed by the platform logic 610. Moreover the dedicated logic for the manageability engine 626 may operate asynchronously with respect to the CPUs 612 and may gather at least some of the telemetry data without increasing the load on the CPUs.

A manageability engine 626 may process telemetry data it collects (specific examples of the processing of stress information will be provided herein). In various embodiments, manageability engine 626 reports the data it collects and/or the results of its processing to other elements in the computer system, such as one or more hypervisors 620 or other operating systems and/or system management software (which may run on any suitable logic such as system management platform 606). In particular embodiments, a critical event such as a core that has accumulated an excessive amount of stress may be reported prior to the normal interval for reporting telemetry data (e.g., a notification may be sent immediately upon detection).

Additionally, manageability engine 626 may include programmable code configurable to set which CPU(s) 612 a particular chipset 616 will manage and/or which telemetry data will be collected.

Chipsets 616 also each include a communication interface 628. Communication interface 628 may be used for the communication of signaling and/or data between chipset 616 and one or more I/O devices, one or more networks 608, and/or one or more devices coupled to network 608 (e.g., system management platform 606). For example, communication interface 628 may be used to send and receive network traffic such as data packets. In a particular embodiment, a communication interface 628 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 616 (e.g., manageability engine 626 or switch 630) and another device coupled to network 608. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 628 may allow communication of data (e.g., between the manageability engine 626 and the data center management platform 606) associated with management and monitoring functions performed by manageability engine 626. In various embodiments, manageability engine 626 may utilize elements (e.g., one or more NICs) of communication interfaces 628 to report the telemetry data (e.g., to system management platform 606) in order to reserve usage of NICs of communication interface 618 for operations associated with workloads performed by platform logic 610.

Switches 630 may couple to various ports (e.g., provided by NICs) of communication interface 628 and may switch data between these ports and various components of chipset 616 (e.g., one or more Peripheral Component Interconnect Express (PCIe) lanes coupled to CPUs 612). Switches 630 may be a physical or virtual (i.e., software) switch.

Platform logic 610 may include an additional communication interface 618. Similar to communication interfaces 628, communication interfaces 618 may be used for the communication of signaling and/or data between platform logic 610 and one or more networks 608 and one or more devices coupled to the network 608. For example, communication interface 618 may be used to send and receive network traffic such as data packets. In a particular embodiment, communication interfaces 618 comprise one or more physical NICs. These NICs may enable communication between any suitable element of platform logic 610 (e.g., CPUs 612 or memory 614) and another device coupled to network 608 (e.g., elements of other platforms or remote computing devices coupled to network 608 through one or more networks).

Platform logic 610 may receive and perform any suitable types of workloads. A workload may include any request to utilize one or more resources of platform logic 610, such as one or more cores or associated logic. For example, a workload may comprise a request to instantiate a software component, such as an I/O device driver 624 or guest system 622; a request to process a network packet received from a virtual machine 632 or device external to platform 602A (such as a network node coupled to network 608); a request to execute a process or thread associated with a guest system 622, an application running on platform 602A, a hypervisor 620 or other operating system running on platform 602A; or other suitable processing request.

A virtual machine 632 may emulate a computer system with its own dedicated hardware. A virtual machine 632 may run a guest operating system on top of the hypervisor 620. The components of platform logic 610 (e.g., CPUs 612, memory 614, chipset 616, and communication interface 618) may be virtualized such that it appears to the guest operating system that the virtual machine 632 has its own dedicated components.

A virtual machine 632 may include a virtualized NIC (vNIC), which is used by the virtual machine as its network interface. A vNIC may be assigned a media access control (MAC) address or other identifier, thus allowing multiple virtual machines 632 to be individually addressable in a network.

VNF 634 may comprise a software implementation of a functional building block with defined interfaces and behavior that can be deployed in a virtualized infrastructure. In particular embodiments, a VNF 634 may include one or more virtual machines 632 that collectively provide specific functionalities (e.g., wide area network (WAN) optimization, virtual private network (VPN) termination, firewall operations, load-balancing operations, security functions, etc.). A VNF 634 running on platform logic 610 may provide the same functionality as traditional network components implemented through dedicated hardware. For example, a VNF 634 may include components to perform any suitable NFV workloads, such as virtualized evolved packet core (vEPC) components, mobility management entities, 3rd Generation Partnership Project (3GPP) control and data plane components, etc.

SFC 636 is a group of VNFs 634 organized as a chain to perform a series of operations, such as network packet processing operations. Service function chaining may provide the ability to define an ordered list of network services (e.g. firewalls, load balancers) that are stitched together in the network to create a service chain.

A hypervisor 620 (also known as a virtual machine monitor) may comprise logic to create and run guest systems 622. The hypervisor 620 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 610. Services of hypervisor 620 may be provided by virtualizing in software or through hardware assisted resources that require minimal software intervention, or both. Multiple instances of a variety of guest operating systems may be managed by the hypervisor 620. Each platform 602 may have a separate instantiation of a hypervisor 620.

Hypervisor 620 may be a native or bare-metal hypervisor that runs directly on platform logic 610 to control the platform logic and manage the guest operating systems. Alternatively, hypervisor 620 may be a hosted hypervisor that runs on a host operating system and abstracts the guest operating systems from the host operating system. Hypervisor 620 may include a virtual switch 638 that may provide virtual switching and/or routing functions to virtual machines of guest systems 622. The virtual switch 638 may comprise a logical switching fabric that couples the vNICs of the virtual machines 632 to each other, thus creating a virtual network through which virtual machines may communicate with each other.

Virtual switch 638 may comprise a software element that is executed using components of platform logic 610. In various embodiments, hypervisor 620 may be in communication with any suitable entity (e.g., a SDN controller) which may cause hypervisor 620 to reconfigure the parameters of virtual switch 638 in response to changing conditions in platform 602 (e.g., the addition or deletion of virtual machines 632 or identification of optimizations that may be made to enhance performance of the platform).

Hypervisor 620 may also include resource allocation logic 644, which may include logic for determining allocation of platform resources based on the telemetry data (which may include stress information). Resource allocation logic 644 may also include logic for communicating with various components of platform logic 610 entities of platform 602A to implement such optimization, such as components of platform logic 610.

Any suitable logic may make one or more of these optimization decisions. For example, system management platform 606; resource allocation logic 644 of hypervisor 620 or other operating system; or other logic of computer platform 602A may be capable of making such decisions. In various embodiments, the system management platform 606 may receive telemetry data from and manage workload placement across multiple platforms 602. The system management platform 606 may communicate with hypervisors 620 (e.g., in an out-of-band manner) or other operating systems of the various platforms 602 to implement workload placements directed by the system management platform.

The elements of platform logic 610 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 602A may be coupled together in any suitable manner such as through one or more networks 608. A network 608 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 7:
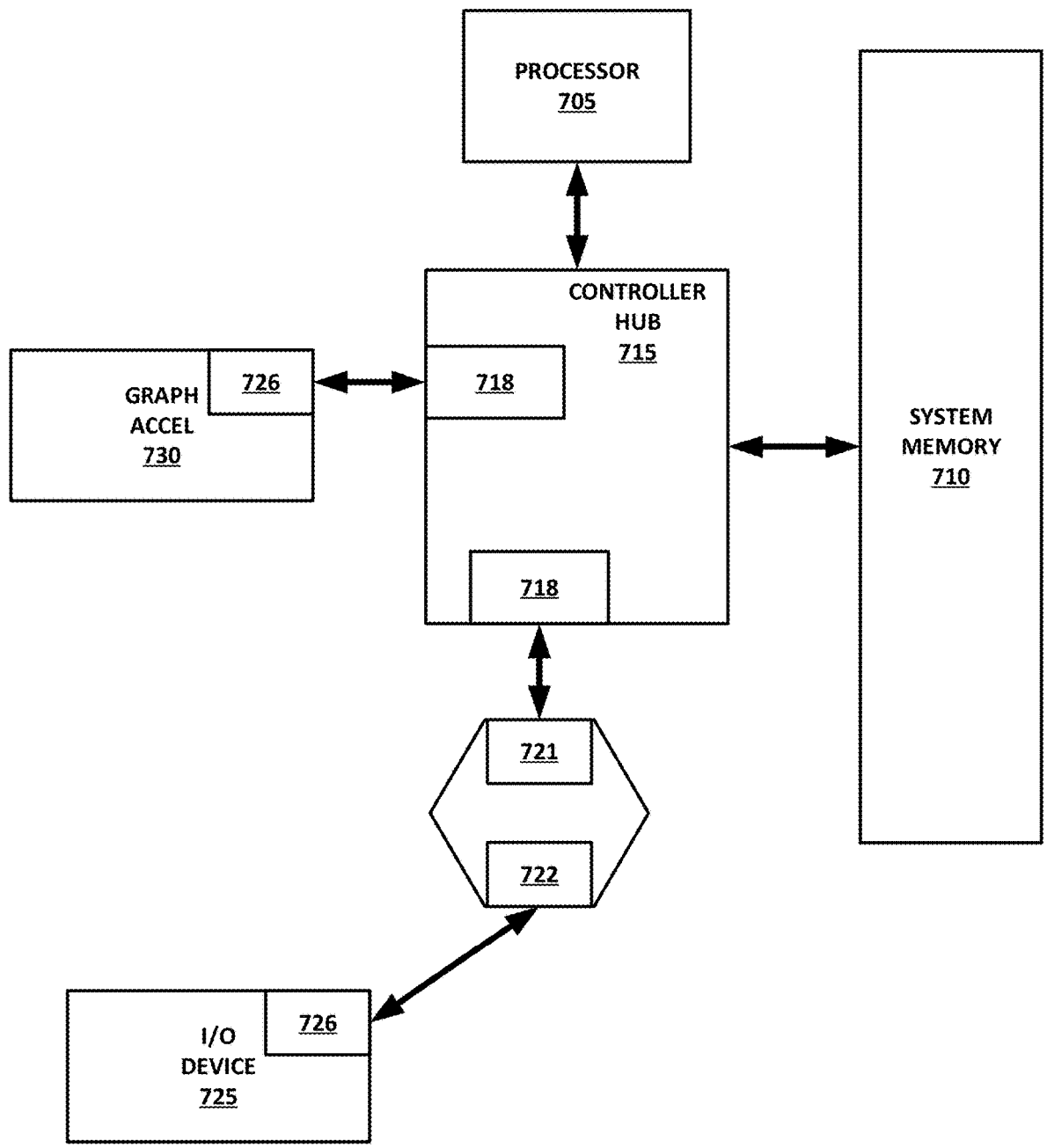
FIG. 7 illustrates an embodiment of a fabric composed of point-to-point links that interconnect a set of components, according to one or more examples of the present specification.

FIG. 7 illustrates an embodiment of a fabric composed of point-to-point links that interconnect a set of components, according to one or more examples of the present specification. Embodiments of point-to-point links disclosed herein may be adapted or configured to interoperate with a platform interface layer and protocol for accelerators according to the teachings of the present specification. System 700 includes processor 705 and system memory 710 coupled to controller hub 715. Processor 705 includes any processing element, such as a microprocessor, a host processor, an embedded processor, a coprocessor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with differential interconnect standards.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe) interconnection hierarchy. Examples of controller hub 715 include a chipset, a memory controller hub (MCH), a northbridge, an interconnect controller hub (ICH), a southbridge, and a root controller/hub. Often the term chipset refers to two physically separate controller hubs, i.e., a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e., up a hierarchy towards a root complex, to controller hub 715 and downstream, i.e., down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a network interface controller (NIC), an add-in card, an audio processor, a network processor, a hard-drive, a storage device, a CD/DVD ROM, a monitor, a printer, a mouse, a keyboard, a router, a portable storage device, a Firewire device, a universal serial bus (USB) device, a scanner, and other input/output devices. Often in the PCIe vernacular, such as device is referred to as an endpoint. Although not specifically shown, device 725 may include a PCIe to PCI/PCI-X bridge to support legacy or other-version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
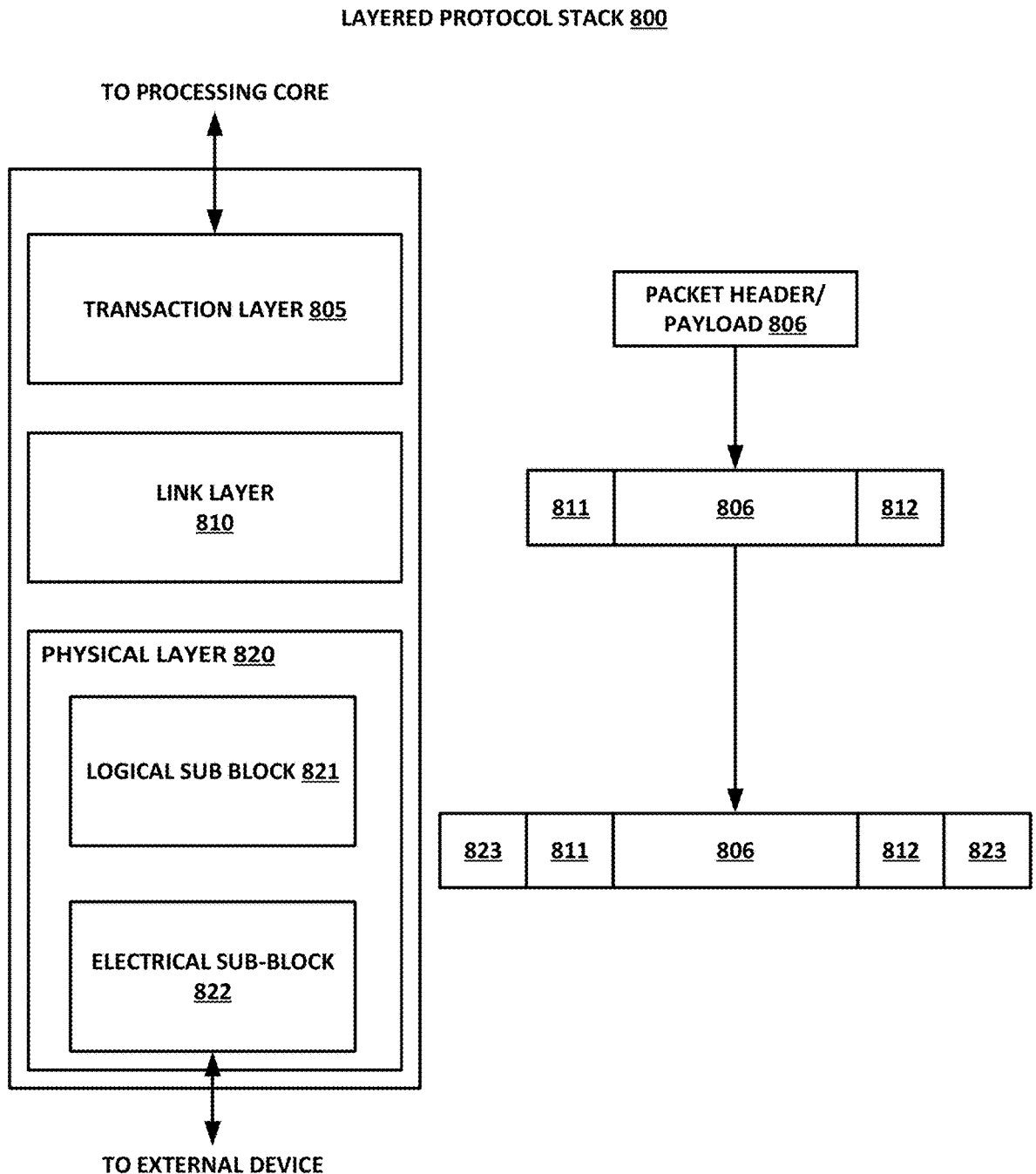
FIG. 8 illustrates an embodiment of a layered protocol stack, according to one or more embodiments of the present specification.

FIG. 8 illustrates an embodiment of a layered protocol stack 800, according to one or more embodiments of the present specification. Embodiments of layered protocol stack 800 disclosed herein may be adapted or configured to interoperate with a platform interface layer and protocol for accelerators according to the teachings of the present specification. Layered protocol stack 800 includes any form of a layered communication stack, such as a Quick Path Interconnect (QPI) stack, a PCie stack, a next generation high performance computing interconnect stack, or other layered stack. Although the discussion immediately below in reference to FIGS. 7-10 is presented in relation to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 1, may be represented as communication protocol stack 800. Representation as a communication protocol stack may also be referred to as a module or interface implementing/including a protocol stack.

PCIe uses packets to communicate information between components. Packets are formed in the transaction layer 805 and data link layer 810 to carry the information from the transmitting component to the receiving component. As the transmitted packets flow through the other layers, they are extended with additional information necessary to handle packets at those layers. At the receiving side the reverse process occurs and packets get transformed from their physical layer 820 representation to the data link layer 810 representation and finally (for transaction layer packets) to the form that can be processed by the transaction layer 805 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets, i.e., transaction layer packets (TLPs). The translation layer 805 typically manages credit-based flow control for TLPs. PCIe implements split transactions, i.e., transactions with request and response separated by time, allowing a link to carry other traffic while the target device gathers data for the response.

In addition, PCIe utilizes credit-based flow control. In this scheme, a device advertises an initial amount of credit for each of the receive buffers in transaction layer 805. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more read requests and write requests to transfer data to/from a memory-mapped location. In one embodiment, memory space transactions are capable of using two different address formats, e.g., a short address format, such as a 32-bit address, or a long address format, such as a 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Figure 9:
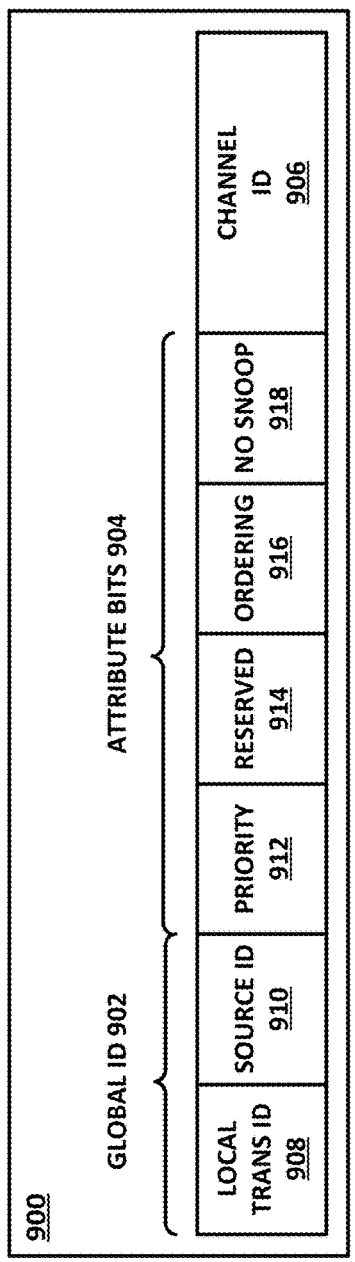
FIGS. 9-10 illustrate embodiments of a peripheral component interconnect express (PCIe) transaction descriptor and a PCIe serial point-to-point fabric, according to examples of the present specification.
Figure 10:
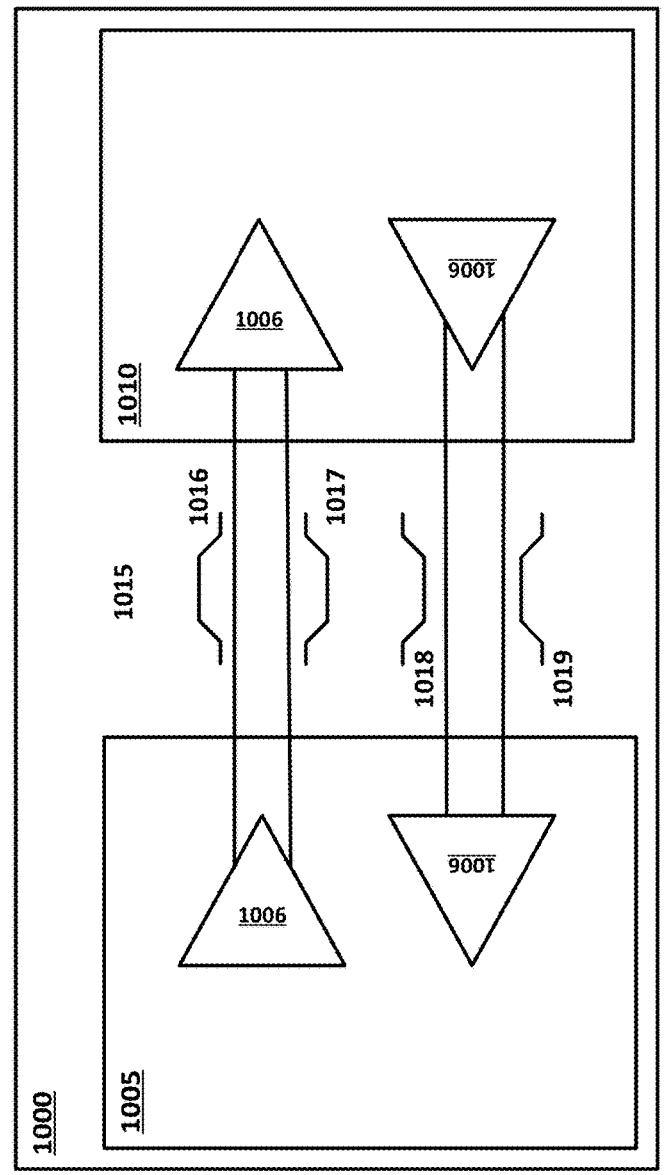

FIGS. 9-10 illustrate embodiments of a PCIe transaction descriptor and a PCIe serial point-to-point fabric, according to examples of the present specification. Embodiments of a PCIe transaction descriptor and a PCIe serial point-to-point fabric disclosed herein may be adapted or configured to interoperate with a platform interface layer and protocol for accelerators according to the teachings of the present specification.

FIG. 9 illustrates an embodiment of a PCIe transaction descriptor, according to one or more examples of the present specification. In one embodiment, transaction descriptor 900 is a mechanism for carrying transaction information. In this regard, transaction descriptor 900 supports identification of transactions in a system. Other potential uses include tracking modifications of default transaction ordering and association of transaction with channels.

Transaction descriptor 900 includes global identifier field 902, attributes field 904 and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 910 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 914, ordering field 916, and no-snoop field 918. Here, priority subfield 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 916 is used to supply optional information conveying the type of ordering that may modify default ordering rules. According to one example implementation, an ordering attribute of "0" denotes default ordering rules to apply, wherein an ordering attribute of "1" denotes relaxed ordering, writes can pass writes in the same direction, and read completions can pass writes in the same direction. Snoop attribute field 918 is utilized to determine if transactions are snooped. As shown, channel ID field 906 identifies a channel that a transaction is associated with.

Link Layer

Link layer 810, also referred to as data link layer 810, acts as an intermediate stage between transaction layer 805 and the physical layer 820. In one embodiment, a responsibility of the data link layer 810 is providing a reliable mechanism for exchanging transaction layer packets (TLPs) between two linked components. One side of the data link layer 810 accepts TLPs assembled by the transaction layer 805, applies packet sequence identifier 811, i.e., an identification number or packet number, calculates and applies an error detection code, i.e., CRC 812, and submits the modified TLPs to the physical layer 820 for transmission across a physical to an external device.

Physical Layer

In one embodiment, physical layer 820 includes logical sub-block 821 and electrical sub-block 822 to physically transmit a packet to an external device. Here, logical sub-block 821 is responsible for the "digital" functions of physical layer 821. In this regard, the logical sub-block includes a transmit section to prepare outgoing information for transmission by physical sub-block 822, and a receiver section to identify and prepare received information before passing it to the link layer 810.

Physical block 822 includes a transmitter and a receiver. The transmitter is supplied by logical sub-block 821 with symbols, which the transmitter serializes and transmits onto an external device. The receiver is supplied with serialized symbols from an external device and transforms the received signals into a bit-stream. The bit-stream is de-serialized and supplied to logical sub-block 821. In one embodiment, an 8 b/10 b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e., a transaction layer; a second layer to sequence packets, i.e., a link layer; and a third layer to transmit the packets, i.e., a physical layer. As a specific example, a common standard interface (CSI) layered protocol is utilized.

FIG. 10 illustrates an embodiment of a PCIe serial point-to-point fabric, according to one or more examples of the present specification. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e., paths 1016 and 1017, and two receiving paths, i.e., paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 1015. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 1016 and 1017, to transmit differential signals. As an example, when line 1016 toggles from a low voltage level to a high voltage level, i.e., a rising edge, line 1017 drives from a high logic level to a low logic level, i.e., a falling edge. Differential signals potentially demonstrate better electrical characteristics, such as better signal integrity, i.e., cross-coupling, voltage overshoot/undershoot, ringing, etc. This allows for a better timing window, which enables faster transmission frequencies.

Figure 11:
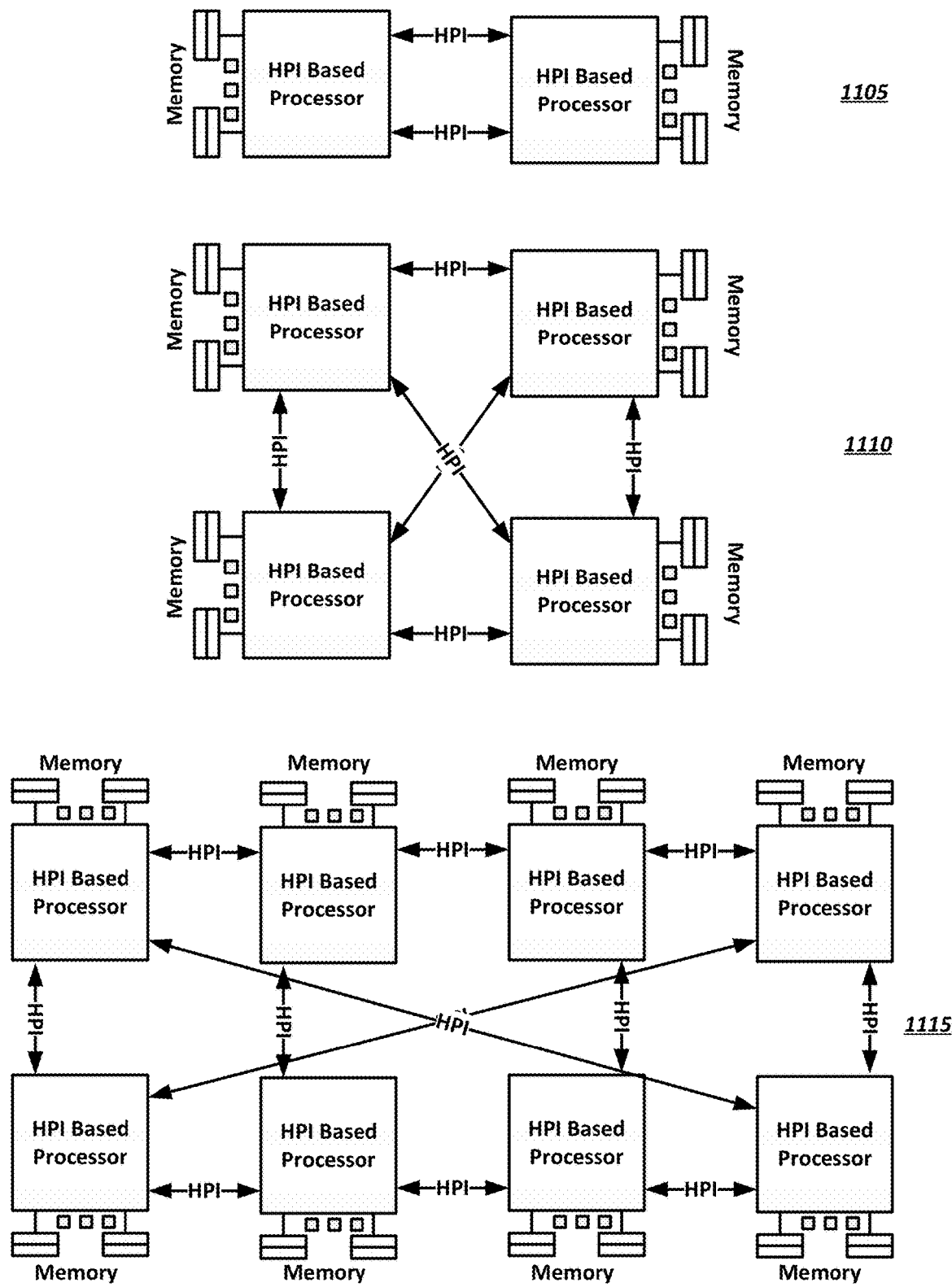
FIG. 11 illustrates embodiments of multiprocessor configurations utilizing a high performance interconnect architecture, according to one or more examples of the present specification.

FIG. 11 illustrates an embodiment of multiple potential multi-socket configurations. Embodiments of multi-socket configurations disclosed herein may be adapted or configured to interoperate with a platform interface layer and protocol for accelerators according to the teachings of the present specification. A two-socket configuration 1105, as depicted, includes two HPI links; however, in other implementations, one HPI link may be utilized. For larger topologies, any configuration may be utilized as long as an ID is assignable and there is some form of virtual path. As shown 4 socket configuration 1110 has an HPI link from each processor to another. But in the 8 socket implementation shown in configuration 1115, not every socket is directly connected to each other through an HPI link. However, if a virtual path exists between the processors, the configuration is supported. A range of supported processors includes 2-32 in a native domain. Higher number of processors may be reached through use of multiple domains or other interconnects between node controllers.

The HPI architecture includes a definition of a layered protocol architecture, which is similar to PCIe in that it also includes a layered protocol architecture. In one embodiment, HPI defines protocol layers (coherent, non-coherent, and optionally other memory based protocols), a routing layer, a link layer, and a physical layer. Furthermore, as many other interconnect architecture's HPI includes enhancements related to power managers, design for test and debug (DFT), fault handling, registers, security, etc.

Figure 12:
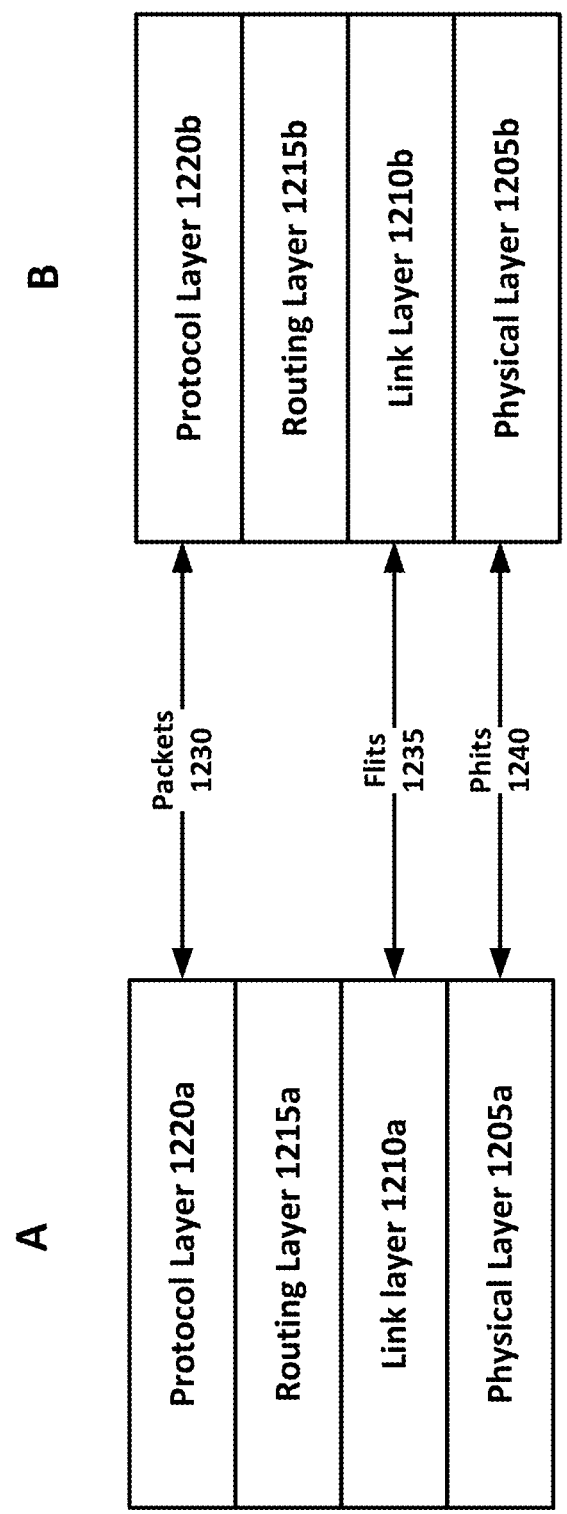
FIG. 12 illustrates an embodiment of a layered stack for a high performance interconnect architecture, according to one or more examples of the present specification.

FIG. 12 illustrates an embodiment of potential layers in the HPI layered protocol stack; however, these layers are not required and may be optional in some implementations. Embodiments of layers in the HPI layered protocol stack disclosed herein may be adapted or configured to interoperate with a platform interface layer and protocol for accelerators according to the teachings of the present specification. Each layer deals with its own level of granularity or quantum of information (the protocol layer 1205$a,b$ with packets 1230, link layer 1210$a,b$ with flits 1235, and physical layer 1205$a,b$ with phits 1240). Note that a packet, in some embodiments, may include partial flits, a single flit, or multiple flits based on the implementation.

As a first example, a width of a phit 1240 includes a 1 to 1 mapping of link width to bits (e.g. 20 bit link width includes a phit of 20 bits, etc.). Flits may have a greater size, such as 184, 192, or 200 bits. Note that if phit 1240 is 20 bits wide and the size of flit 1235 is 184 bits then it takes a fractional number of phits 1240 to transmit one flit 1235 (e.g. 9.2 phits at 20 bits to transmit an 184 bit flit 1235 or 9.6 at 20 bits to transmit a 192 bit flit). Note that widths of the fundamental link at the physical layer may vary. For example, the number of lanes per direction may include 2, 4, 6, 8, 10, 12, 14, 16, 18, 20, 22, 24, etc. In one embodiment, link layer 1210$a,b$ is capable of embedding multiple pieces of different transactions in a single flit, and within the flit multiple headers (e.g. 1, 2, 3, 4) may be embedded within the flit. Here, HPI splits the headers into corresponding slots to enable multiple messages in the flit destined for different nodes.

Physical layer 1205$a,b$, in one embodiment, is responsible for the fast transfer of information on the physical medium (electrical or optical etc.). The physical link is point to point between two Link layer entities, such as layer 1205$a$ and 1205$b$. The Link layer 1210$a,b$ abstracts the Physical layer 1205$a,b$ from the upper layers and provides the capability to reliably transfer data (as well as requests) and manage flow control between two directly connected entities. It also is responsible for virtualizing the physical channel into multiple virtual channels and message classes. The Protocol layer 1220$a,b$ relies on the Link layer 1210$a,b$ to map protocol messages into the appropriate message classes and virtual channels before handing them to the Physical layer 1205*a,b* for transfer across the physical links. Link layer 1210*a,b* may support multiple messages, such as a request, snoop, response, writeback, non-coherent data, etc.

In one embodiment, to provide reliable transmission cyclic redundancy check (CRC) error checking and recovery procedures are provided by the Link layer 1210*a,b* in order to isolate the effects of routine bit errors that occur on the physical interconnect. The Link layer 1210*a* generates the CRC at the transmitter and checks at the receiver Link layer 1210*b*.

In some implementations, link layer 1210*a,b* utilized a credit scheme for flow control. During initialization, a sender is given a set number of credits to send packets or flits to a receiver. Whenever a packet or flit is sent to the receiver, the sender decrements its credit counters by one credit which represents either a packet or a flit, depending on the type of virtual network being used. Whenever a buffer is freed at the receiver, a credit is returned back to the sender for that buffer type. When the sender's credits for a given channel have been exhausted, in one embodiment, it stops sending any flits in that channel. Essentially, credits are returned after the receiver has consumed the information and freed the appropriate buffers.

In one embodiment, routing layer 1215*a,b* provides a flexible and distributed way to route packets from a source to a destination. In some platform types (for example, uniprocessor and dual processor systems), this layer may not be explicit but could be part of the Link layer 1210*a,b*; in such a case, this layer is optional. It relies on the virtual network and message class abstraction provided by the Link Layer 1210*a,b* as part of the function to determine how to route the packets. The routing function, in one implementation, is defined through implementation specific routing tables. Such a definition allows a variety of usage models.

In one embodiment, protocol layer 1220*a,b* implement the communication protocols, ordering rule, and coherency maintenance, I/O, interrupts, and other higher-level communication. Note that protocol layer 1220*a,b*, in one implementation provides messages to negotiate power states for components and the system. As a potential addition, physical layer 1205*a,b* may also independently or in conjunction set power states of the individual links.

Multiple agents may be connect to an HPI architecture, such as a home agent (orders requests to memory), caching (issues requests to coherent memory and responds to snoops), configuration (deals with configuration transactions), interrupt (processes interrupts), legacy (deals with legacy transactions), non-coherent (deals with non-coherent transactions), and others. More specific discussion of the layers for HPI are discussed below.

An overview of a few potential features of HPI includes: not utilizing pre-allocation at home nodes; no ordering requirements for a number of message classes; packing multiple messages in a single flit (protocol header) (i.e., a packed flit that can hold multiple messages in defined slots); a wide link that may scale from 4, 8, 16, 20, or more lanes; a large error checking scheme that may utilize 8, 16, 32, or as much as 64 bits for error protection; and utilizing an embedded clocking scheme.

HPI Physical Layer

The Physical layer 1205*a,b* (or PHY) of HPI rests above the electrical layer (i.e., electrical conductors connecting two components) and below the link layer 1210*a,b*, as illustrated in FIG. 12. The physical layer resides on each agent and connects the link layers on two agents (A and B) separated from each other. The local and remote electrical layers are connected by physical media (e.g. wires, conductors, optical, etc.). The physical layer 1205*a,b*, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, physical layer 1205*a,b* is also: to meet a reliability/error standard, tolerate a failure of a lane on a link and go to a fraction of nominal width, tolerate single failures in opposite direction of a link, support hot add/remove, enabling/disabling PHY ports, timeout initialization attempts when the number of attempts has exceeded a specified threshold etc.

In one embodiment, HPI utilizes a rotating bit pattern. For example when a flit size is not aligned with a multiple of the lanes in an HPI link, the flit may not be able to be sent in an integer multiple of transmissions over the lanes (e.g. a 192-bit flit is not a clean multiple of an exemplary 20 lane link. So at ×20 flits may be interleaved to avoid wasting bandwidth (i.e., sending a partial flit at some point without utilizing the rest of the lanes). The interleaving, in one embodiment, is determined to optimize latency of key fields and multiplexers in the transmitter (Tx) and receiver (Rx). The determined patterning also potentially provides for clean and quick transitioning to/from a smaller width (e.g., ×8) and seamless operation at the new width.

In one embodiment, HPI utilizes an embedded clock, such as a 20 bit embedded clock or other number of bit embedded clock. Other high performance interfaces may use a forwarded clock or other clock for in-band reset. By embedding clock in HPI, it potentially reduces pinout. However, using an embedded clock, in some implementations, may result in different apparatus and methods to handle in-band reset. As a first, example a blocking link state to hold off link flit transmission and allow PHY usage (described in more detail in the Appendix A) is utilized after initialization. As a second example, electrical ordered sets, such as an electrically idle ordered set (EIOS) may be utilized during initialization.

In one embodiment, HPI is capable of utilizing a first bit width direction without a forwarded clock and a second, smaller bit width link for power management. As an example, HPI includes a partial link width transmitting state, where a partial width is utilized (e.g. a ×20 full width and a ×8 partial width); however, the widths are purely illustrative and may differ. Here, the PHY may handle partial width power management without link layer assist or intervention. In one embodiment, a blocking link state (BLS) protocol is utilized to enter the partial width transmitting state (PWTS). PWTS exit, in one or more implementations, may use the BLS protocol or squelch break detection. Due to absence of a forwarded clock, PWTLS exit may include a re-deskew, which maintains determinism of the link.

In one embodiment, HPI utilizes Tx adaptation. As an example, loopback state and hardware is used for Tx Adaptation. As on example, HPI is capable of counting actual bit errors; this may be able to be performed by injecting specialized patterns. As a result, HPI should be able to get better electrical margins at lower power. When using the loopback state, one direction may be used as a hardware backchannel with metrics sent as part of a training sequence (TS) payload.

In one embodiment, HPI is able to provide latency fixing without exchanging sync counter values in a TS. Other interconnect may perform latency fixing based on such exchanging of a sync counter value in each TS. Here, HPI may utilize periodically recurring Electrically Idle Exit Ordered Sets (EIEOS) as a proxy for the sync counter value by aligning the EIEOS to the sync counter. This potentially saves TS payload space, removes aliasing, and DC balance concerns, as well as simplify the calculation of latency to be added.

In one embodiment, HPI provides for software and timer control of a link state machine transitions. Other interconnect may support a semaphore (hold bit) that is set by hardware on entering an initialization state. Exit from the state occurs when the hold bit is cleared by software. HPI, in one implementation, allows software to control this type of mechanism for entering a transmitting link state or a loop back pattern state. In one embodiment, HPI allows for exit from handshake sates to be based on a software programmable timeout after handshake, which potentially makes test software easier.

In one embodiment, HPI utilizes Pseudo Random Bit Sequence (PRBS) scrambling of TS. As an example a 23-bit PRBS is utilized (PRBS23). In one embodiment, the PRBS is generated by a similar bit size, self-seeded storage element, such as a linear feedback shift register. As one example, a fixed UI pattern may be utilized to scramble with a bypass to an adaptation state. But by scrambling TS with PRBS23, Rx adaptation may be performed without the bypass. In addition, offset and other errors may be reduced during clock recovery and sampling. The HPI approach relies on using Fibonacci LFSRs which can be self-seeded during specific portions of the TS.

In one embodiment, HPI supports an emulated slow mode without changing PLL clock frequency. Some designs may use separate PLLs for slow and fast speed. Yet, in on implementation, HPI use emulated slow mode (i.e., PLL clock runs at fast speed; TX repeats bits multiple times; RX oversamples to locate edges and identify the bit). This means that ports sharing a PLL may coexist at slow and fast speeds. In one example where the multiple is an integer ratio of fast speed to slow speed, different fast speeds may work with the same slow speed, which may be used during the discovery phase of hot attach.

In one embodiment, HPI supports a common slow mode frequency for hot attach. Emulated slow mode, as described above, allows HPI ports sharing a PLL to coexist at slow and fast speeds. When a designer sets the emulation multiple as an integer ratio of fast speed to slow speed, then different fast speeds may work with the same slow speed. So, two agents which support at least one common frequency may be hot attached irrespective of the speed at which the host port is running. Software discovery may then use the slow mode link to identify and setup the most optimal link speeds.

In one embodiment, HPI supports re-initialization of link without termination changes. One could provide re-initialization on an in-band reset having clock lane terminations changed for the discovery process used in reliability, availability, and serviceability (RAS). In one embodiment, re-initialization for HPI may be done without changing the termination values when HPI includes a RX screening of incoming signaling to identify good lanes.

In one embodiment, HPI supports robust low power link state (LPLS) entry. As an example, HPI may include a minimum stay in LPLS (i.e., a minimum amount of time, UI, counter value, etc. that a link stays in LPLS before an exit). Alternatively, LPLS entry may be negotiated and then use an in-band reset to enter LPLS. But this may mask an actual in-band reset originating from the second agent in some cases. HPI, in some implementations, allows a first agent to enter LPLS and a second agent to enter Reset. The first agent is unresponsive for a time period (i.e., the minimum stay), which allows the second agent to complete reset and then wake up the first agent, enabling a much more efficient, robust entry into LPLS.

In one embodiment, HPI supports features such as debouncing detect, wake and continuous screening for lane failures. HPI may look for a specified signaling pattern for an extended period of time to detect a valid wake from a LPLS thus reducing the chances of a spurious wake. The same hardware may also be used in the background for continuously screening for bad lanes during the initialization process making for a more robust RAS feature.

In one embodiment, HPI supports a deterministic exit for lock step and restart-replay. In HPI, some TS boundaries may coincide with flit boundaries when operating at full width. So HPI may identify and specify the exit boundaries such that lock-step behavior may be maintained with another link. In addition, HPI may specify timers which may be used to maintain lock step with a link pair. After initialization, HPI may also support operation with in-band resets disabled to support some flavors of lock-step operation.

In one embodiment, HPI supports use of TS header instead of payload for key initialization parameters. Alternatively, TS payload may be used to exchange unit parameters like ACKs and lane numbers. And DC levels for communicating lane polarity may also be used. Yet, HPI may use DC balanced codes in the TS header for key parameters. This potentially reduces the number of bytes needed for a payload and potentially allows for an entire PRBS23 pattern to be used for scrambling TS, which reduces the need for DC balancing the TS.

In one embodiment, HPI supports measures to increase noise immunity of active lanes during partial width transmitting link state (PWTLS) entry/exit of idle lanes. In one embodiment, null (or other non-retryable flits) flits may be used around the width change point to increase noise immunity of active lanes. Additionally, HPI may utilize null flits around the start of PWTLS exit (i.e., the null flits may be broken up with data flits). HPI may also use specialized signaling, whose format may be varied to reduce chances of false wake detects.

In one embodiment, HPI supports use of specialized patterns during PWTLS exit to allow non-blocking deskew. Alternatively, idle lanes may not be deskewed on PWTLS exit since they may maintain skew with help of a forwarded clock. Yet, with use of an embedded clock, HPI may use specialized signaling, whose format may be varied to reduce chances of false wake detects and also allow for deskew without blocking flit flow. This also allows for more robust RAS by seamlessly powering down failing lanes, re-adapting them, and bringing them back online without blocking the flow of flits.

In one embodiment, HPI supports low power link state (LPLS) entry without link layer support and more robust LPLS exit. Alternatively, link layer negotiation may be depended on between pre-designated master and slave to enter LPLS from transmitting link sate (TLS). In HPI, the PHY may handle negotiation using blocking link state (BLS)

codes and may support both agents being masters or initiators, as well as entry into LPLS directly from PWTLS. Exit from LPLS may be based on debouncing a squelch break using a specific pattern followed by handshake between the two sides and a timeout induced in-band reset if any of this fails.

In one embodiment, HPI supports controlling unproductive looping during initialization. Alternatively, a failure to init (e.g. lack of good lanes) may result in retrying the init too many times, which potentially wastes power and is difficult to debug. In HPI, the link-pair may try to init a set number of times before calling it quits and powering down in a reset state, where software may make adjustments before retrying the init. This potentially improves the RAS of the system.

In one embodiment, HPI supports advanced IBIST (interconnect built in self-test) options. In one embodiment, a pattern generator may be utilized, which allows for two non-correlated PRBS23 patterns of maximum length for any pin. In one embodiment, HPI may be able to support four such patterns, as well as provide the ability to control the length of these patterns (i.e., dynamically vary test pattern, PRBS23 length).

In one embodiment, HPI provides advanced logic to deskew lanes. As an example, the TS boundary after TS lock may be used to deskew the lanes. In addition, HPI may deskew by comparing lane PRBS patterns in the LFSR during specific points in the payload. Such deskew might be useful in test chips, which may lack ability to detect TS or state machines to manage the deskew.

In one embodiment, exit from init to link transmitting occurs on a TS boundary with planetary alignment. In addition, HPI may support a negotiated delay from that point. In addition, the order of exit between the two directions may be controlled by using master-slave determinism allowing for one instead of two planetary alignment controls for the link pair.

Some implementations use a fixed 128UI pattern to scramble TS. Others use a fixed 4 k PRBS23 to scramble TS. HPI, in one embodiment, allows for using any length PRBS including an entire (8M-1) PRBS23 sequence.

In some architectures adaptation is of fixed duration. In one embodiment, the exit from Adapt is handshaked rather than timed. This means that Adapt times may be asymmetric between the two directions and as long as needed by either side.

In one embodiment, a state machine may bypass states if those state actions don't need to be redone. However, this may lead to more complex designs and validation escapes. HPI doesn't use bypasses—instead it distributes actions such that short timers in each state may be used to perform the actions and bypasses avoided. This potentially makes for more uniform and synchronized state machine transitions.

In some architectures, forwarded clock is utilized for in-band reset and link layer for staging partial width transmitting and for low power link entry. HPI uses block linking state codes similar functions. These codes potentially could have bit errors leading to 'mismatches' at Rx. HPI includes a protocol for dealing with mismatches as well as means to handle asynchronous reset, low power link state and partial width link state requests.

In one embodiment, a 128 UI scrambler is utilized for loopback TS. However, this can lead to aliasing for TS lock when loopback begins; so some architecture's changes the payload to all 0s during this. In another embodiment, HPI utilizes a uniform payload and uses the periodically occurring unscrambled EIEOS for TS lock.

Some architectures utilize scrambled TS during init. In one embodiment, HPI defines supersequences that are combinations of scrambled TS of various lengths and unscrambled EIEOS. This allows more randomized transitions during init and also simplifies TS lock, latency fixing, and other actions.

HPI Link Layer

Returning to FIG. 12, an embodiment of a logical block for link layer 1210*a*,*b* is illustrated. In one embodiment, Link Layer 1210*a*,*b* guarantees reliable data transfer between two protocol or routing entities. It abstracts Physical layer 1205*a*,*b* from the Protocol layer 1220*a*,*b*, is responsible for the flow control between two protocol agents (A, B), and provides virtual channel services to the Protocol layer (Message Classes) and Routing layer (Virtual Networks). The interface between the Protocol layer 1220*a*,*b* and the Link Layer 1210*a*,*b* is typically at the packet level. In one embodiment, the smallest transfer unit at the Link Layer is referred to as a flit which a specified number of bits, such as 192. The Link Layer 1210*a*,*b* relies on the Physical layer 1205*a*,*b* to frame the Physical layer 1205*a*,*b*'s unit of transfer (phit) into the Link Layer 1210*a*,*b*' unit of transfer (flit). In addition, the Link Layer 1210*a*,*b* may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, flits are expanded 192 bits. However, any range of bits, such as 81-256 (or more) may be utilized in different variations. Here, the CRC field is also increased (e.g. 16 bits) to handle a larger payload.

In one embodiment, TIDs (Transaction IDs) are 11 bits in length. As a result, pre-allocation and the enabling of distributed home agents may be removed. Furthermore, use of 11 bits, in some implementations, allows for the TID to be used without having use for an extended TID mode.

In one embodiment, header flits are divided into 3 slots, 2 with equal size (Slots 0 and 1) and another smaller slot (Slot 2). A floating field may be available for one of Slot 0 or 1 to use. The messages that can use slot 1 and 2 are optimized, reducing the number of bits needed to encode these slots' opcodes. When a header needing more bits that Slot 0 provides enters the link layer, slotting algorithms are in place to allow it to take over Slot 1 payload bits for additional space. Special control (e.g. LLCTRL) flits may consume all 3 slots worth of bits for their needs. Slotting algorithms may also exist to allow individual slots to be utilized while other slots carry no information, for cases where the link is partially busy. Other interconnect may allow a single message per flit, instead of multiple. The sizing of the slots within the flit, and the types of messages that can be placed in each slot, potentially provide the increased bandwidth of HPI even with a reduced flit rate. For a more detailed description of flits and the multi-slot header, refer to the flit definition section of Appendix B.

In HPI, a large CRC baseline may improve error detection. For example, a 16 bit CRC is utilized. As a result of the larger CRC, a larger payload may also be utilized. The 16 bits of CRC in combination with a polynomial used with those bits improves error detection. As an example, the are a minimum number of gates to provide 1) 1-4 bit errors detected 2) errors of burst length 16 or less are detected.

In one embodiment, a rolling CRC based on two CRC-16 equations is utilized. Two 16 bit polynomials may be used, the polynomial from HPI CRC-16 and a second polynomial. The second polynomial has the smallest number of gates to implement while retaining the properties of 1) all 1-7 bit errors detected 2) per lane burst protection in ×8 link widths 3) all errors of burst length 16 or less are detected.

In one embodiment, a reduced max flit rate (9.6 versus 4 UI) is utilized, but increased throughput of the link is obtained. As a result of the increased flit size, introduction of multiple slots per flit, optimized utilization of payload bits (changed algorithms to remove or relocate infrequently used fields), more interconnect efficiency is achieved.

In one embodiment, part of the support for 3 slots includes 192 bit flit. The floating field enables 11 extra bits of payload for either slot 0 or slot 1. Note if a larger flit is used more floating bits may be used. And as a corollary, if a smaller flit is used, then less floating bits are provided. By allowing a field to float between the two slots, we can provide the extra bits needed for certain messages, while still staying within 192 bits and maximizing the utilization of the bandwidth. Alternatively, providing an 11 bit HTID field to each slot may use an extra 11 bits in the flit which would not be as efficiently utilized.

Some interconnects may transmit Viral status in protocol level messages and Poison status in data flits. In one embodiment, HPI protocol level messages and Poison status are moved to control flits. Since these bits are infrequently used (only in the case of errors), removing them from the protocol level messages potentially increases flit utilization. Injecting them using control flits still allows containment of the errors.

In one embodiment, CRD and ACK bits in a flit allow return of a number of credits, such as eight, or the number of acks, such as 8. As part of the fully encoded credit fields, these bits are utilized as Credit[n] and Acknowledge[n] when Slot 2 is encoded as LLCRD. This potentially improves efficiency by allowing any flit to return the number of VNA Credits and the number of Acknowledges using a total of only 2 bits, but also allowing their definitions to remain consistent when a fully encoded LLCRD return is used.

In one embodiment, VNA vs. VN0/1 encoding (saves bits by aligning slots to same encoding). The slots in a multi-slot header flit may be aligned to just VNA, just VN0, or just VN1. By enforcing this, per slot bits indicating VN are removed. This increases the efficiency of flit bit utilization and potentially enables expanding from 10 bit TIDs to 11 bit TIDs.

Some fields only allow return in increments of 1 (for VN0/1), 2/8/16 (for VNA), and 8 (for Acknowledge). This means that returning a large number of pending Credits or Acknowledges may use multiple return messages. It also means that odd numbered return values for VNA and Acknowledge may be left stranded pending accumulation of an evenly divisible value. HPI may have fully encoded Credit and Ack return fields, allowing an agent to return all accumulated Credits or Acks for a pool with a single message. This potentially improves link efficiency and also potentially simplifies logic implementation (return logic can implement a "clear" signal rather than a full decrementer).

Routing Layer

In one embodiment, Routing layer 1215*a,b* provides a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, on some implementations, is thin since the routing tables, and, hence the routing algorithms, are not specifically defined by specification. This allows a variety of usage models, including flexible platform architectural topologies to be defined by the system implementation. The Routing layer 1215*a,b* relies on the Link layer 1210*a,b* for providing the use of up to three (or more) virtual networks (VNs)—in one example, two deadlock-free VNs, VN0 and VN1 with several message classes defined in each virtual network. A shared adaptive virtual network (VNA) may be defined in the link layer, but this adaptive network may not be exposed directly in Routing Concepts, since each Message class and VN may have dedicated resources and guaranteed forward progress.

A non-exhaustive, exemplary list of routing rules includes: (1) (Message class invariance): An incoming packet belonging to a particular message class may be routed on an outgoing HPI port/virtual network in the same message class; (2) (Switching) HPI platforms may support the "store-and-forward" and "virtual cut through" types of switching. In another embodiment, HPI may not support "wormhole" or "circuit" switching. (3) (Interconnect deadlock freedom) HPI platforms may not rely on adaptive flows for deadlock-free routing. With platforms, which use both VN0 and VN1, the 2 VNs together may be used for deadlock-free routing; and (4) (VN0 for "leaf" routers). In HPI platforms, which may use both VN0 and VN1, it is permissible to use VN0 for those components, whose routers are not used route-through; that is, incoming ports have HPI destinations that terminate at this component. In such a case, packets from different VNs can be routed to VN0. Other rules (for example, movement of packets between VN0 and VN1) may be governed by a platform dependent routing algorithm.

Routing Step: A routing step, in one embodiment, is referred to by a routing function (RF) and a selection function (SF). The routing function may take, as inputs, a HPI port at which a packet arrives and a destination NodeID; it then yields as output a 2-tuple—the HPI port number and the virtual network—which the packet should follow on its path to the destination. It is permitted for the routing function to be additionally dependent on the incoming virtual network. Further, it is permitted with the routing step to yield multiple <port #, virtual network> pairs. The resulting routing algorithms are called adaptive. In such a case, a selection function SF may choose a single 2-tuple based on additional state information which the router has (for example, with adaptive routing algorithms, the choice of a particular port of virtual network may depend on the local congestion conditions). A routing step, in one embodiment, consists of applying the routing function and then the selection function to yield the 2-tuple(s).

Router Table Simplifications: HPI platforms may implement legal subsets of the virtual networks. Such subsets simplify the size of the routing table (reduce the number of columns) associated virtual channel buffering and arbitration at the router switch. These simplifications ay come at the cost of platform flexibility and features. VN0 and VN1 may be deadlock-free networks which provide deadlock freedom either together or singly, depending on the usage model, usually with minimal virtual channel resources assigned to them. Flat organization of the routing table may include a size corresponding to the maximum number of NodeIDs. With such an organization, the routing table may be indexed by the destination NodeID field and possibly by the virtual network ID field. The table organization can also be made hierarchical with the destination NodeID field being sub-divided into multiple subfields, which is implementation dependent. For example, with a division into "local" and "non-local" parts, the "non-local" part of the routing is completed before the routing of the "local" part. The potential advantage of reducing the table size at every input port comes at the potential cost of being forced to assign NodeIDs to HPI components in a hierarchical manner Routing Algorithm: A routing algorithm, in one embodiment, defines the set of permissible paths from a source module to a destination module. A particular path from the source to the destination is a subset of the permissible paths and is obtained as a series of routing steps defined above starting with the router at the source, passing through zero or more intermediate routers, and ending with the router at the destination. Note that even though an HPI fabric may have multiple physical paths from a source to a destination, the paths permitted are those defined by the routing algorithm.

HPI Coherence Protocol

In one embodiment, the HPI Coherence Protocol is included in layer 1220a,b is to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing the HPI Coherence Protocol. First, the protocol maintains data consistency, as an example on a per-address basis, among data in agents' caches and between those data and the data in memory. Informally, data consistency may refer to each valid line of data in an agent's cache representing a most up-to-date value of the data and data transmitted in a coherence protocol packet represents the most up-to-date value of the data at the time it was sent. When no valid copy of the data exists in caches or in transmission, the protocol may ensure the most up-to-date value of the data resides in memory. Second, the protocol provides well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

The HPI Coherence Protocol also may ensure the forward progress of coherence requests made by an agent to an address in the coherent memory space. Certainly, transactions may eventually be satisfied and retired for proper system operation. The HPI Coherence Protocol, in some embodiments, may have no notion of retry for resolving resource allocation conflicts. Thus, the protocol itself may be defined to contain no circular resource dependencies, and implementations may take care in their designs not to introduce dependencies that can result in deadlocks. Additionally, the protocol may indicate where designs are able to provide fair access to protocol resources.

Logically, the HPI Coherence Protocol, in one embodiment, consists of three items: coherence (or caching) agents, home agents, and the HPI interconnect fabric connecting the agents. Coherence agents and home agents work together to achieve data consistency by exchanging messages over the interconnect. The link layer 1210a,b and its related description provides the details of the interconnect fabric including how it adheres to the coherence protocol's requirements, discussed herein. (It may be noted that the division into coherence agents and home agents is for clarity. A design may contain multiple agents of both types within a socket or even combine agents behaviors into a single design unit).

In one embodiment, HPI does not pre-allocate resources of a Home Agent. Here, a Receiving Agent receiving a request allocates resource to process it. An Agent sending a request allocates resources for responses. In this scenario, HPI may follow two general rules regarding resource allocation. First, an agent receiving a request may be responsible for allocating the resource to process it. Second, an agent generating a request may be responsible for allocating resources to process responses to the request.

For allocation of resources may also extend to HTID (along with RNID/RTID) in snoop requests The potential reduction of using a home agent and forward responses to support responses to Home Agent (and data forwarding to requesting agent).

In one embodiment, home agent resources are also not pre-allocated in snoop requests and forward responses to support responses to the home agent (and data forwarding to the requesting agent.

In one embodiment, there is no pre-allocation of Home resources Ability to send CmpO "early", before Home Agent is finished processing request, when it is safe for requesting agent to reuse its RTID resource. General handling of snoops with similar RNID/RTID in system also part of protocol.

In one embodiment, conflict resolution is performed using an ordered response channel. A Coherence Agent uses RspCnflt as request for a Home Agent to send a FwdCnfltO, which will be ordered with the CmpO (if any already scheduled) for the Coherence Agent's conflicting request.

In one embodiment, HPI supports conflict resolution via an ordered response channel. A Coherence Agent using information from snoop to aid in processing FwdCnfltO, which has no "type" information and no RTID for forwarding data to requesting agent.

In one embodiment, a Coherence Agent blocks forwards for writeback requests to maintain data consistency. But it also allows Coherence Agent to use a writeback request to commit uncacheable (UC) data before processing forward and allows the Coherence Agent to writeback partial cache lines instead of protocol supporting a partial implicit writeback for forwards.

In one embodiment, a read invalidate (RdInv) request accepting Exclusive-state data is supported. Semantics of uncacheable (UC) reads include flushing modified data to memory. Some architecture, however, allowed forwarding M data to invalidating reads, which forced the requesting agent to clean the line if it received M data. The RdInv simplifies the flow but it does not allow E data to be forwarded.

In one embodiment, HPI support an InvItoM to IODC functionality. An InvItoM requests exclusive ownership of a cache line without receiving data and with the intent of performing a writeback soon afterward. A required cache state may be an M state, and E state, or either.

In one embodiment, HPI supports a WbFlush for persistent memory flush. An embodiment of a WbFlush is illustrated below. It may be sent as a result of a persistent commit. May flush write to persistent memory.

In one embodiment, HPI supports additional operations, such as SnpF for "fanout" snoops generated by the Routing Layer. Some architectures don't have explicit support for fanout snoops. Here, a HPI Home agent generates single "fanout" snoop request and, in response, the Routing Layer generates snoops to all peer agents in the "fanout cone". Home agent may expect snoop responses from each of the agent Sections.

In one embodiment, HPI supports additional operations, such as SnpF for "fanout" snoops generated by the Routing Layer. Some architectures don't have explicit support for fanout snoops. Here, a HPI Home agent generates single "fanout" snoop request and, in response, the Routing Layer generates snoops to all peer agents in the "fanout cone". Home agent may expect snoop responses from each of the agent Sections.

In one embodiment, HPI supports an explicit writeback with cache-push hint (WbPushMtoI). In one embodiment, a Coherence Agent writes back modified data with a hint to Home Agent that it may push the modified data to a "local" cache, storing in M state, without writing the data to memory.

In one embodiment, a Coherence Agent may keep F state when forwarding shared data. In on example, a Coherence Agent with F state that receives a "sharing" snoop or forward after such a snoop may keep the F state while sending S state to the requesting agent.

In one embodiment, protocol tables may be nested by having one table refer to another sub-table in the "next state" columns, and the nested table can have additional or finer-grained guards to specify which rows (behaviors) are permitted.

In one embodiment, Protocol tables use row spanning to indicate equally permissible behaviors (rows) instead of adding "Bias" bits to select among behaviors.

In one embodiment, action tables are organized for use as functionality engine for BFM (validation environment tool) rather than having BFM team create their own BFM engine based upon their interpretation.

HPI Non-Coherent Protocol

In one embodiment, HPI supports non-coherent transactions. As an example, a non-coherent transaction is referred to as one that does not participate in the HPI coherency protocol. Non-coherent transactions comprise requests and their corresponding completions. For some special transactions, a broadcast mechanism.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes an accelerator apparatus, comprising: a programmable region capable of being programmed to provide an accelerator function unit (AFU); and a platform interface layer (PIL) to communicatively couple to the AFU via an intra-accelerator protocol, and to provide multiplexed communication with a processor via a plurality of platform interconnect interfaces, wherein the PIL is to provide abstracted communication services for the AFU to communicate with the processor.

Example 2 includes the accelerator apparatus of example 1, wherein the intra-accelerator protocol is a core cache interface version P (CCI-P) protocol.

Example 3 includes the accelerator apparatus of example 1, wherein the plurality of platform interconnect interfaces comprises a first low-latency interface and a second high-bandwidth interface, wherein the PIL is configured to select a preferred platform interconnect interface for a data transaction.

Example 4 includes the accelerator apparatus of example 1, wherein the plurality of platform interconnect interfaces comprises a first cache-coherent interface, and a second non-cache-coherent interface, wherein the PIL is to select a preferred platform interconnect interface for a data transaction.

Example 5 includes the accelerator apparatus of example 4, wherein the first cache-coherent interface is an ultra-path interconnect (UPI) interface.

Example 6 includes the accelerator apparatus of example 4, wherein the second non-cache-coherent interface is a peripheral component interconnect express (PCIe) interface.

Example 7 includes the accelerator apparatus of example 1, wherein the PIL is to provide to the AFU a non-ordered memory model.

Example 8 includes the accelerator apparatus of example 7, wherein the PIL is to support non-posted writes and write fences.

Example 9 includes the accelerator apparatus of example 1, wherein the PIL is to provide a plurality of virtual channels to the AFU.

Example 10 includes the accelerator apparatus of example 9, wherein the plurality of virtual channels comprise a first virtual channel tuned for low latency, and a second virtual channel tuned for high bandwidth bursts.

Example 11 includes the accelerator apparatus of example 1, wherein the PIL is to provide a burst mode to guarantee that a burst request does not cross a page boundary.

Example 12 includes the accelerator apparatus of example 1, wherein the PIL is to support cache hints from the AFU, wherein supporting cache hints comprises receiving a cache hint from the AFU for a transaction, selecting a platform interconnect for the transaction, and handling the cache hint contextually according to a capability of the platform interconnect.

Example 13 includes the accelerator apparatus of example 1, wherein the PIL is to support an address width matching the processor virtual address width via the platform interconnect interface, wherein the intra-accelerator protocol is to be agnostic of virtual or physical addressing.

Example 14 includes the accelerator apparatus of example 1, wherein the PIL is further to provide power management of the accelerator apparatus.

Example 15 includes the accelerator apparatus of example 1, wherein the PIL is further to provide thermal management of the accelerator apparatus.

Example 16 includes the accelerator apparatus of any of examples 1-15, wherein the accelerator apparatus comprises an FPGA, the PIL comprises a first region of the FPGA, and the AFU comprises a second region of the FPGA.

Example 17 includes the accelerator apparatus of any of examples 1-15, wherein the PIL comprises an intellectual property block.

Example 18 includes the accelerator apparatus of any of examples 1-15, wherein the PIL comprises a co-processor.

Example 19 includes one or more tangible, non-transitory computer-readable mediums having stored thereon, the instructions to: provide a platform interface layer (PIL) for an accelerator apparatus, the PIL to communicatively couple to an accelerator function unit (AFU) via an intra-accelerator protocol, and to provide multiplexed communication with a processor via a plurality of platform interconnect interfaces, wherein the PIL is to provide abstracted communication services for the AFU to communicate with the processor.

Example 20 includes the one or more tangible, non-transitory computer-readable mediums of example 19, wherein the intra-accelerator protocol is a core cache interface version P (CCI-P) protocol.

Example 21 includes the one or more tangible, non-transitory computer-readable mediums of example 19, wherein the plurality of platform interconnect interfaces comprises a first low-latency interface and a second high-bandwidth interface, wherein the PIL is configured to select a preferred platform interconnect interface for a data transaction.

Example 22 includes the one or more tangible, non-transitory computer-readable mediums of example 19, wherein the plurality of platform interconnect interfaces comprises a first cache-coherent interface, and a second non-cache-coherent interface, wherein the PIL is to select a preferred platform interconnect interface for a data transaction.

Example 23 includes the one or more tangible, non-transitory computer-readable mediums of example 22, wherein the first cache-coherent interface is an ultra-path interconnect (UPI) interface.

Example 24 includes the one or more tangible, non-transitory computer-readable mediums of example 22, wherein the second non-cache-coherent interface is a peripheral component interconnect express (PCIe) interface.

Example 25 includes the one or more tangible, non-transitory computer-readable mediums of example 19, wherein the PIL is to provide to the AFU a non-ordered memory model.

Example 26 includes the one or more tangible, non-transitory computer-readable mediums of example 25, wherein the PIL is to support non-posted writes and write fences.

Example 27 includes the one or more tangible, non-transitory computer-readable mediums of example 19, wherein the PIL is to provide a plurality of virtual channels to the AFU.

Example 28 includes the one or more tangible, non-transitory computer-readable mediums of example 27, wherein the plurality of virtual channels comprise a first virtual channel tuned for low latency, and a second virtual channel tuned for high bandwidth bursts.

Example 29 includes the one or more tangible, non-transitory computer-readable mediums of example 19, wherein the PIL is to provide a burst mode to guarantee that a burst request does not cross a page boundary.

Example 30 includes the one or more tangible, non-transitory computer-readable mediums of example 19, wherein the PIL is to support cache hints from the AFU, wherein supporting cache hints comprises receiving a cache hint from the AFU for a transaction, selecting a platform interconnect for the transaction, and handling the cache hint contextually according to a capability of the platform interconnect.

Example 31 includes the one or more tangible, non-transitory computer-readable mediums of example 19, wherein the PIL is to support an address width matching the processor virtual address width via the platform interconnect interface, wherein the intra-accelerator protocol is to be agnostic of virtual or physical addressing.

Example 32 includes the one or more tangible, non-transitory computer-readable mediums of example 19, wherein the PIL is further to provide power management of the accelerator apparatus.

Example 33 includes the one or more tangible, non-transitory computer-readable mediums of example 19, wherein the PIL is further to provide thermal management of the accelerator apparatus.

Example 34 includes the one or more tangible, non-transitory computer-readable mediums of any of examples 19-33, wherein the instructions comprise instructions for programming a field-programmable gate array (FPGA).

Example 35 includes the one or more tangible, non-transitory computer-readable mediums of example 34, wherein the instructions comprise register transfer language (RTL) instructions.

Example 36 includes the one or more tangible, non-transitory computer-readable mediums of any of examples 19-33, wherein the instructions comprise hardware description language instructions to provide an intellectual property block.

Example 37 includes the one or more tangible, non-transitory computer-readable mediums of any of examples 19-33, wherein the instructions comprise executable software instructions.

Example 38 includes a method of providing a platform interface layer (PIL) for an accelerator apparatus, comprising: communicatively coupling to an accelerator function unit (AFU) via an intra-accelerator protocol; providing multiplexed communication with a processor via a plurality of platform interconnect interfaces, comprising providing abstracted communication services for the AFU to communicate with the processor.

Example 39 includes the method of example 38, wherein the intra-accelerator protocol is a core cache interface version P (CCI-P) protocol.

Example 40 includes the method of example 38, wherein the plurality of platform interconnect interfaces comprises a first low-latency interface and a second high-bandwidth interface, wherein the PIL is configured to select a preferred platform interconnect interface for a data transaction.

Example 41 includes the method of example 38, wherein the plurality of platform interconnect interfaces comprises a first cache-coherent interface, and a second non-cache-coherent interface, wherein the PIL is to select a preferred platform interconnect interface for a data transaction.

Example 42 includes the method of example 41, wherein the first cache-coherent interface is an ultra-path interconnect (UPI) interface.

Example 43 includes the method of example 41, wherein the second non-cache-coherent interface is a peripheral component interconnect express (PCIe) interface.

Example 44 includes the method of example 38, further comprising providing to the AFU a non-ordered memory model.

Example 45 includes the method of example 44, further comprising supporting non-posted writes and write fences.

Example 46 includes the method of example 38, further comprising providing a plurality of virtual channels to the AFU.

Example 47 includes the method of example 46, wherein the plurality of virtual channels comprise a first virtual channel tuned for low latency, and a second virtual channel tuned for high bandwidth bursts.

Example 48 includes the method of example 38, further comprising providing a burst mode to guarantee that a burst request does not cross a page boundary.

Example 49 includes the method of example 38, further comprising supporting cache hints from the AFU, wherein supporting cache hints comprises receiving a cache hint from the AFU for a transaction, selecting a platform interconnect for the transaction, and handling the cache hint contextually according to a capability of the platform interconnect.

Example 50 includes the method of example 38, further comprising supporting an address width matching the processor virtual address width via the platform interconnect interface, wherein the intra-accelerator protocol is to be agnostic of virtual or physical addressing.

Example 51 includes the method of example 38, further comprising providing power management of the accelerator apparatus.

Example 52 includes the method of example 38, further comprising providing thermal management of the accelerator apparatus.

Example 53 includes an apparatus comprising means for providing the method of any of examples 38-52.

Example 54 includes the apparatus of example 53, wherein the means comprise a field-programmable gate array (FPGA).

Example 55 includes the apparatus of example 54, wherein the FPGA comprises a first region for the PIL, and a second region for the AFU.

Example 56 includes the apparatus of example 53, wherein the means comprise an intellectual property (IP) block.

Example 57 includes the apparatus of example 53, wherein the means comprise a co-processor.

Example 58 includes one or more tangible, non-transitory computer-readable mediums having stored thereon instructions to carry out the method or provision a device configured to carry out the method of any of examples 38-52.

Example 59 includes the one or more tangible, non-transitory computer-readable mediums of example 58, wherein the instructions comprise instructions for programming a field-programmable gate array (FPGA).

Example 60 includes the one or more tangible, non-transitory computer-readable mediums of example 59, wherein the instructions comprise register transfer language (RTL) instructions.

Example 61 includes the one or more tangible, non-transitory computer-readable mediums of example 58, wherein the instructions comprise hardware description language instructions to provide an intellectual property block.

Example 62 includes the one or more tangible, non-transitory computer-readable mediums of example 58, wherein the instructions comprise executable software instructions.

What is claimed is:

1. An accelerator apparatus, comprising:
a programmable region capable of being programmed to provide an accelerator function unit (AFU); and
a platform interface layer (PIL) to communicatively couple to the AFU via an intra-accelerator protocol, and to provide multiplexed communication with a processor via a plurality of platform interconnect interfaces, wherein the PIL is to provide abstracted communication services for the AFU to communicate with the processor,
wherein the PIL is to support cache hints from the AFU, wherein supporting cache hints comprises receiving a cache hint from the AFU for a transaction, selecting a platform interconnect for the transaction, and handling the cache hint contextually according to a capability of the platform interconnect.

2. The accelerator apparatus of claim 1, wherein the intra-accelerator protocol is a core cache interface version P (CCI-P) protocol.

3. The accelerator apparatus of claim 1, wherein the plurality of platform interconnect interfaces comprises a first low-latency interface and a second high-bandwidth interface, wherein the PIL is configured to select a preferred platform interconnect interface for a data transaction.

4. The accelerator apparatus of claim 1, wherein the plurality of platform interconnect interfaces comprises a first cache-coherent interface, and a second non-cache-coherent interface, wherein the PIL is to select a preferred platform interconnect interface for a data transaction.

5. The accelerator apparatus of claim 4, wherein the first cache-coherent interface is an ultra-path interconnect (UPI) interface.

6. The accelerator apparatus of claim 4, wherein the second non-cache-coherent interface is a peripheral component interconnect express (PCIe) interface.

7. The accelerator apparatus of claim 1, wherein the PIL is to provide to the AFU a non-ordered memory model.

8. The accelerator apparatus of claim 7, wherein the PIL is to support non-posted writes and write fences.

9. The accelerator apparatus of claim 1, wherein the PIL is to provide a plurality of virtual channels to the AFU.

10. The accelerator apparatus of claim 9, wherein the plurality of virtual channels comprise a first virtual channel tuned for low latency, and a second virtual channel tuned for high bandwidth bursts.

11. The accelerator apparatus of claim 1, wherein the PIL is to provide a burst mode to guarantee that a burst request does not cross a page boundary.

12. The accelerator apparatus of claim 1, wherein the PIL is to support an address width matching a processor virtual address width via a platform interconnect interface of the plurality of platform interconnect interfaces, wherein the intra-accelerator protocol is to be agnostic of virtual or physical addressing.

13. The accelerator apparatus of claim 1, wherein the PIL is further to provide power management of the accelerator apparatus.

14. The accelerator apparatus of claim 1, wherein the PIL is further to provide thermal management of the accelerator apparatus.

15. The accelerator apparatus of claim 1, wherein the accelerator apparatus comprises an FPGA, the PIL comprises a first region of the FPGA, and the AFU comprises a second region of the FPGA.

16. The accelerator apparatus of claim 1, wherein the PIL comprises an intellectual property block.

17. The accelerator apparatus of claim 1, wherein the PIL comprises a co-processor.

18. One or more tangible, non-transitory computer-readable mediums having stored thereon a plurality of instructions that, when executed, causes a computing device to:
provide a platform interface layer (PIL) for an accelerator apparatus, the PIL to communicatively couple to an accelerator function unit (AFU) via an intra-accelerator protocol, and to provide multiplexed communication with a processor via a plurality of platform interconnect interfaces, wherein the PIL is to provide abstracted communication services for the AFU to communicate with the processor.

19. The one or more tangible, non-transitory computer-readable mediums of claim 18, wherein the intra-accelerator protocol is a core cache interface version P (CCI-P) protocol.

20. The one or more tangible, non-transitory computer-readable mediums of claim 18, wherein the plurality of platform interconnect interfaces comprises a first low-latency interface and a second high-bandwidth interface, wherein the PIL is configured to select a preferred platform interconnect interface for a data transaction.

21. The one or more tangible, non-transitory computer-readable mediums of claim 18, wherein the plurality of platform interconnect interfaces comprises a first cache-coherent interface, and a second non-cache-coherent interface, wherein the PIL is to select a preferred platform interconnect interface for a data transaction.

22. The one or more tangible, non-transitory computer-readable mediums of claim 21, wherein the first cache-coherent interface is an ultra-path interconnect (UPI) interface.

23. The one or more tangible, non-transitory computer-readable mediums of claim 21, wherein the second non-cache-coherent interface is a peripheral component interconnect express (PCIe) interface.

24. A method of providing a platform interface layer (PIL) for an accelerator apparatus, comprising:
communicatively coupling to an accelerator function unit (AFU) via an intra-accelerator protocol;
providing multiplexed communication with a processor via a plurality of platform interconnect interfaces, comprising providing abstracted communication services for the AFU to communicate with the processor,
wherein the PIL is to support cache hints from the AFU, wherein supporting cache hints comprises receiving a cache hint from the AFU for a transaction, selecting a platform interconnect for the transaction, and handling the cache hint contextually according to a capability of the platform interconnect.

* * * * *